US010708486B2

United States Patent
Lee et al.

(10) Patent No.: US 10,708,486 B2
(45) Date of Patent: Jul. 7, 2020

(54) GENERATION OF A DEPTH-ARTIFICIAL IMAGE BY DETERMINING AN INTERPOLATED SUPPLEMENTARY DEPTH THROUGH INTERPOLATION BASED ON THE ORIGINAL DEPTHS AND A DETECTED EDGE

(71) Applicant: QUALCOMM Incorporated, San Diego, CA (US)

(72) Inventors: Jisoo Lee, San Diego, CA (US); Kyuseo Han, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 16/137,949

(22) Filed: Sep. 21, 2018

(65) Prior Publication Data

US 2019/0253608 A1   Aug. 15, 2019

Related U.S. Application Data

(60) Provisional application No. 62/631,302, filed on Feb. 15, 2018.

(51) Int. Cl.
| | |
|---|---|
| *H04N 5/232* | (2006.01) |
| *H04N 5/272* | (2006.01) |
| *G06T 7/50* | (2017.01) |
| *G06T 5/00* | (2006.01) |
| *H04N 5/262* | (2006.01) |

(52) U.S. Cl.
CPC ......... *H04N 5/23212* (2013.01); *G06T 5/003* (2013.01); *G06T 7/50* (2017.01); *H04N 5/2621* (2013.01); *H04N 5/272* (2013.01)

(58) Field of Classification Search
CPC ................................................ H04N 5/232125
See application file for complete search history.

(56) References Cited

U.S. PATENT DOCUMENTS

| | | | |
|---|---|---|---|
| 8,723,912 B2 | 5/2014 | Michrowski et al. | |
| 9,025,874 B2 | 5/2015 | Fransson et al. | |
| 9,100,562 B2 | 8/2015 | Mohan et al. | |
| 9,613,403 B2 | 4/2017 | Kim et al. | |
| 10,482,618 B2 * | 11/2019 | Jain | G06T 5/50 |
| 2015/0002545 A1 * | 1/2015 | Webster | G09G 5/377 |
| | | | 345/634 |
| 2016/0275657 A1 | 9/2016 | Ezawa et al. | |
| 2019/0141232 A1 * | 5/2019 | Nayar | H04N 5/23212 |

OTHER PUBLICATIONS

Brian R., "Here's how Portrait Mode works on the Google Pixel 2" Oct. 19, 2017, 1 Page.
Levoy M., "Portrait Mode on the Pixel 2 and Pixel 2 XL Smartphones", Oct. 17, 2017, 19 Pages, Retrieved from the Internet: URL: https:// research.googleblog.com/2017/10/portrait-mode-on-pixel-2-and-pixel-2-xl.html [retrieved on Nov. 3, 2017].

\* cited by examiner

*Primary Examiner* — Gary C Vieaux
(74) *Attorney, Agent, or Firm* — Duane Morris LLP

(57) ABSTRACT

An original depth-map of a depth-natural image can be generated. The depth-natural image can include image pixels. The original depth-map can include original depths mapping to one or more of the image pixels. An edge in the depth-natural image can be detected. A supplementary depth can be interpolated based on the original depths and the detected edge. The depth-natural image can be blurred based on the interpolated supplementary depth to generate a depth-artificial image.

21 Claims, 22 Drawing Sheets

GENERATION OF A DEPTH-ARTIFICIAL IMAGE BY DETERMINING AN INTERPOLATED SUPPLEMENTARY DEPTH THROUGH INTERPOLATION BASED ON THE ORIGINAL DEPTHS AND A DETECTED EDGE

PRIORITY

The present application claims the benefit of U.S. Provisional App. No. 62/631,302 entitled IMAGE DEFOCUSING to Lee et al., which was filed on 15 Feb. 2018. The provisional application is hereby incorporated by reference.

BACKGROUND

Field of the Disclosure

The present disclosure relates to digital imaging.

Description of Related Art

A camera can include a lens, an aperture, and an image sensor. Light from a scene can flow through the lens and the aperture until incident on the image sensor. The image sensor can capture an image by measuring the incident light.

Incident light can be in-focus or out-of-focus. Regions of a captured image generated with measurements of in-focus light can be crisp (i.e., in-focus, sharp, etc.). Regions of a captured image produced (i.e., generated) with measurements of out-of-focus light can be blurry (i.e., out-of-focus). Some cameras can move the lens and the aperture to adjust the focus of light incident upon the image sensor (e.g., via autofocus). Other cameras have a fixed (i.e., immobile) lens and/or aperture.

An image can be a two-dimensional projection of a three-dimensional space (called a scene) onto the image sensor. Due to the positioning of internal optics (e.g., lens, aperture, etc.), a camera can naturally divide a scene in the depth-direction into one or more optical fields. Each optical field can be the source of incident light with a particular kind of focus.

A first optical field can be called field-of-focus (also referred to as a zone of acceptable sharpness). The focal plane is located within the field-of-focus, and may be located with about one third of the field-of-focus in front of the focal plane and two thirds of the field-of-focus behind the focal plane. As the focal length increases, the focal plane approaches the center of the field-of-focus. Light from scene objects within the field-of-focus can be in-focus on the image sensor. Therefore, objects (i.e., elements of the scene) within the field-of-focus can be crisp in a captured image. A second optical field can be called defocused foreground. Defocused foreground can precede the field-of-focus. Light from objects within the defocused foreground can be out-of-focus on the image sensor and therefore blurry in the captured image. A third optical field can be called defocused background. Defocused background can follow the field-of-focus. Light from objects within the defocused background can also be out-of-focus on the image sensor and therefore blurry in the captured image.

Based on the scene and optical configuration of the camera, an image can include one or more of field-of-focus, defocused foreground, and defocused background. A mobile device's front-facing camera (sometimes called a "selfie" camera) can have an infinitely deep field-of-focus. A camera can have a focal length that provides a maximum depth of field, so that all objects beyond a hyperfocal distance can be brought into acceptable focus. Alternatively, a front-facing camera can naturally divide a scene into defocused background and/or field-of-focus.

A depth-of-field effect (sometimes called a "Bokeh" effect) can occur when a captured image poses crisp objects in the field-of-focus against blurry objects in the defocused foreground and/or defocused background. Cameras with adjustable lenses and/or apertures may be able to create a natural depth-of-field effect. Cameras without adjustable lenses and/or apertures may be unable to do so, depending on the scene.

SUMMARY

A method for image processing can include, with a processing system including one or more processors: generating an original depth-map of a depth-natural image, the depth-natural image comprising image pixels, the original depth-map comprising original depths, the original depths mapping to one or more of the image pixels; detecting an edge in the depth-natural image; determining an interpolated supplementary depth through interpolation based on the original depths and the detected edge; and blurring the depth-natural image based on the interpolated supplementary depth to generate a first depth-artificial image.

A processing system can include one or more processors configured to: generate an original depth-map of a depth-natural image, the depth-natural image comprising image pixels, the original depth-map comprising original depths, the original depths mapping to one or more of the image pixels; detect an edge in the depth-natural image; determine an interpolated supplementary depth through interpolation based on the original depths and the detected edge; and blur the depth-natural image based on the interpolated supplementary depth to generate a first depth-artificial image.

A non-transitory computer-readable medium can include program code, which, when executed by one or more processors, causes the one or more processors to perform operations. The program code can include code for: generating an original depth-map of a depth-natural image, the depth-natural image comprising image pixels, the original depth-map comprising original depths, the original depths mapping to one or more of the image pixels; detecting an edge in the depth-natural image; determining an interpolated supplementary depth through interpolation based on the original depths and the detected edge; and blurring the depth-natural image based on the interpolated supplementary depth to generate a first depth-artificial image.

A system can include means for generating a depth-artificial image from a depth-natural image. The depth-natural image can include original image pixels. Each of the original image pixels can map to an original depth and an original optical field. The depth-artificial image can include blurred image pixels. Each blurred image pixel can spatially map to one of the original image pixels.

A system can include: means for generating an original depth-map of a depth-natural image, the depth-natural image comprising image pixels, the original depth-map comprising original depths, the original depths mapping to one or more of the image pixels; means for detecting an edge in the depth-natural image; means for determining an interpolated supplementary depth through interpolation based on the original depths and the detected edge; and means for blurring the depth-natural image based on the interpolated supplementary depth to generate a first depth-artificial image.

BRIEF DESCRIPTION OF DRAWINGS

The above summary and the below detailed description of illustrative embodiments may be read in conjunction with the appended Figures. The Figures show some of the illustrative embodiments discussed herein. As further explained below, the claims are not limited to the illustrative embodiments. For clarity and ease of reading, some Figures omit views of certain features. Features are shown schematically.

FIG. 21 schematically identifies focus boundaries and image pixels.

DETAILED DESCRIPTION

Illustrative (i.e., example) embodiments are disclosed. The claims are not limited to the illustrative embodiments. Therefore, some implementations of the claims will have different features than in the illustrative embodiments. Changes to the claimed inventions can be made without departing from their spirit. The claims are intended to cover implementations with such changes.

At times, the present application uses directional terms (e.g., front, back, top, bottom, left, right, etc.) to give the reader context when viewing the Figures. Directional terms do not limit the claims. Any directional term can be replaced with a numbered term (e.g., left can be replaced with first, right can be replaced with second, and so on). Furthermore, any absolute term (e.g., high, low, etc.) can be replaced with a corresponding relative term (e.g., higher, lower, etc.).

Figure 1:
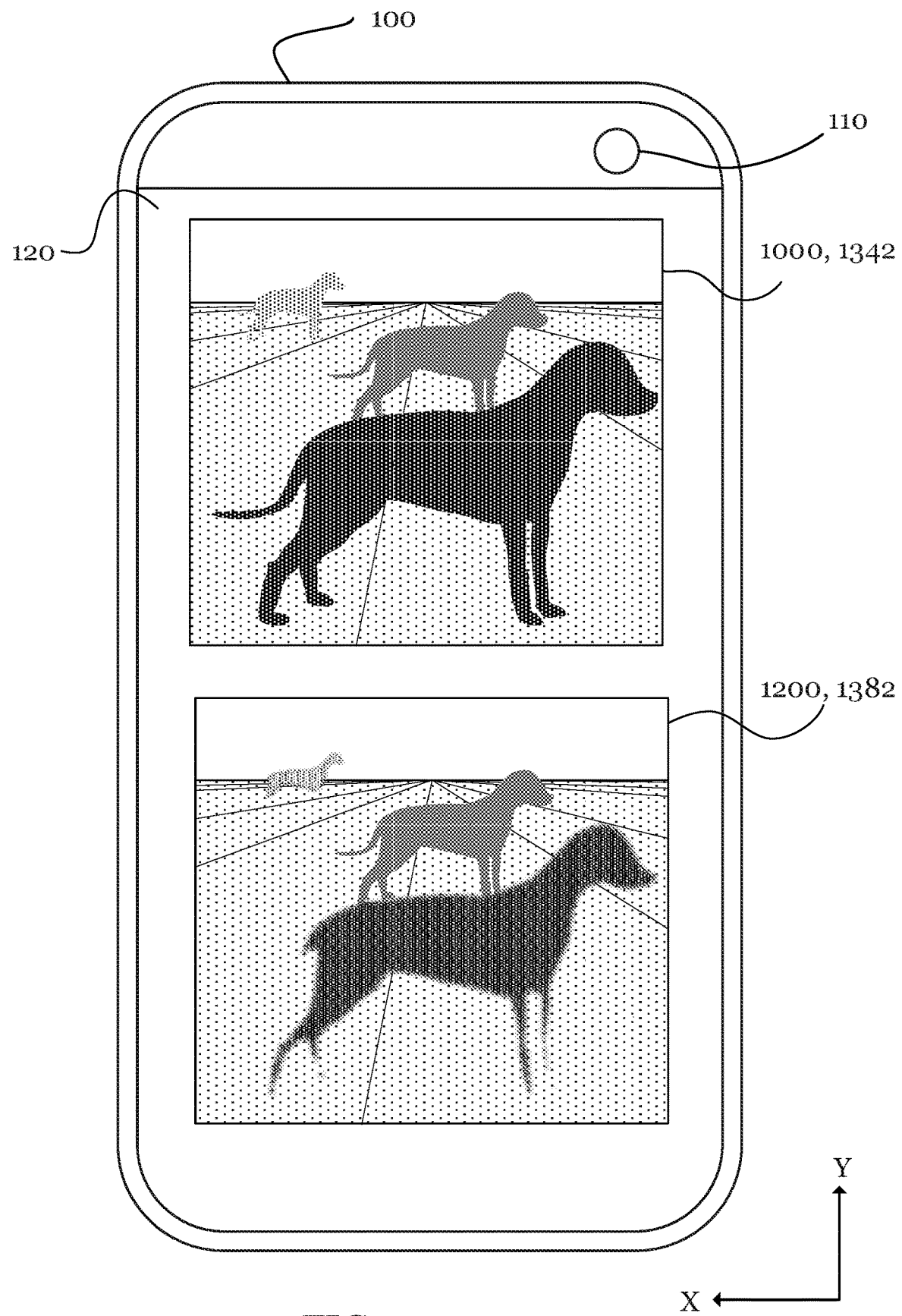
FIG. 1 schematically shows an embodiment of a mobile device, which is simultaneously presenting a depth-natural image and a depth-artificial image.

FIG. 1 shows a mobile device 100. Mobile device 100 can be a smartphone including a front-facing camera 110 (cameras are also called an image sensor packages) and a display 120. Although not shown, mobile device 100 can include a plurality of cameras, at least some of which can be backward-facing. The present disclosure uses front-facing camera 110 to illustrate various features. But the features discussed herein apply to any camera, no matter the direction it is facing. Mobile device 100 is not limited to being a smartphone and can be, for example, a dedicated camera assembly (e.g., a dedicated SLR/DSLR camera), a laptop, a tablet, and so on.

In FIG. 1, mobile device 100 is in a viewfinder mode. Mobile device 100 is simultaneously presenting two images of a scene on display 120. Depth-natural image 1000, 1342 depicts the scene from the perspective of camera 110, given a natural optical state of camera 100 (further discussed below).

Depth-artificial image 1200, 1342 simulates the scene from the perspective of a camera with a different optical state. For example, if camera 110 is equipped with first internal optics, then depth-natural image 1000, 1342 can show the scene as captured by directing light onto the imaging sensor 220 using the first internal optics. By contrast, depth-artificial image 1200, 1342 can simulate how the same scene would appear through different internal optics (e.g., different focal length and/or different aperture size from the focal length and aperture size used to capture the depth-natural image). In some examples, a depth-artificial image can appear to have a narrower depth of field than the depth of field of the depth-natural image. Depth-natural 1342 and depth-artificial 1382 images are further discussed below.

Mobile device 100 can include a processing system ("PS") 600. PS 600 can include camera 110, display 120, one or more processors 601, memory 602, and more. PS 600 is further discussed below with reference to FIG. 6. PS 600 can be configured to perform any methods and operations disclosed herein.

Figure 2:
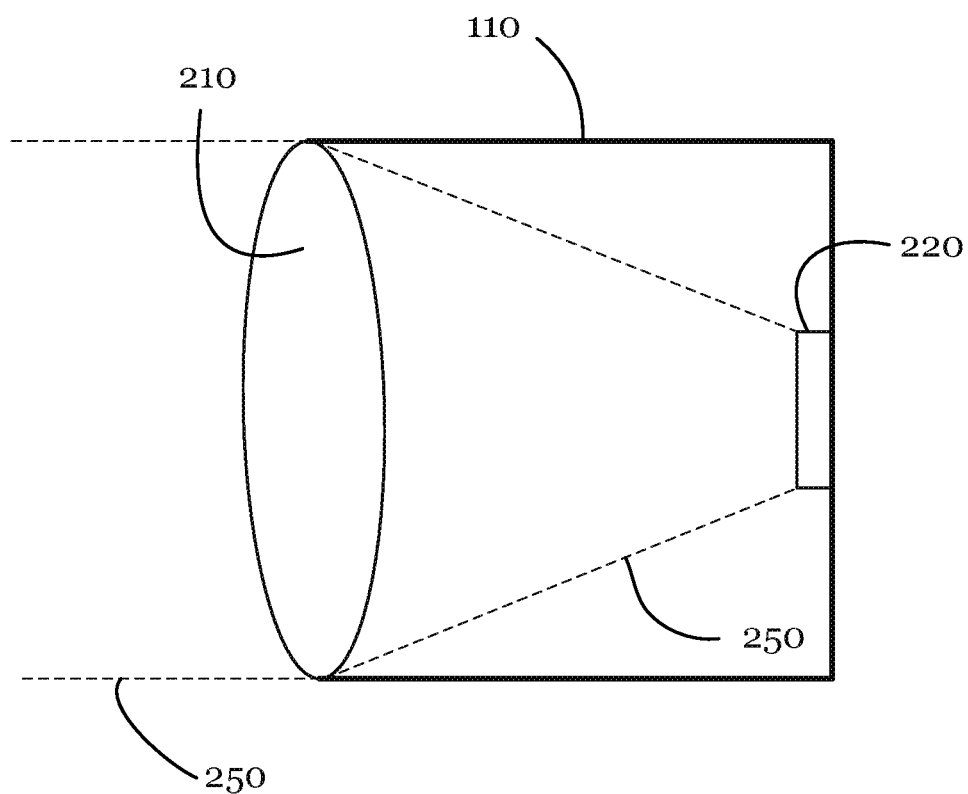
FIG. 2 schematically shows an embodiment of a camera in cross-section. The present disclosure generally uses a front-facing camera as an illustrative example, but the camera can have any orientation and be in any position.

FIG. 2 is a schematic cross section through camera 110, which can include internal optics 210 and an image sensor 220. Optics 210 can include one or more lenses, one or more apertures (fixed or adjustable), one or more mirrors, one or more prisms, one or more autofocus actuators configured to move at least one of the lenses, and so on.

Optics 210 can converge scene light 250 onto image sensor 220. Some of the light 250 can be in-focus on the plane of image sensor 220 (and thus generate in-focus image regions) and some of the light 250 can be out-of-focus on the plane of image sensor 220 (and thus generate blurry image regions). Out-of-focus light can originate from natural defocused foreground and/or natural defocused background.

The Figures are labeled with X, Y, and Z axes. The X axis can be a horizontal dimension. The Y axis can be a vertical dimension. The Z axis can be a depth dimension. According to some embodiments, the axes are consistent across the Figures. Positive movement along the X axis is generally called "to the right", while negative movement along the X axis is generally called "to the left". Some Figures (e.g., FIG. 10) look toward the scene. Others look toward camera 110. In Figures looking toward camera 110, the terms "right" and "left" may be opposite of the physical page. The axes are only for the reader's convenience and do not limit the claimed inventions to a particular orientation.

Figure 3:
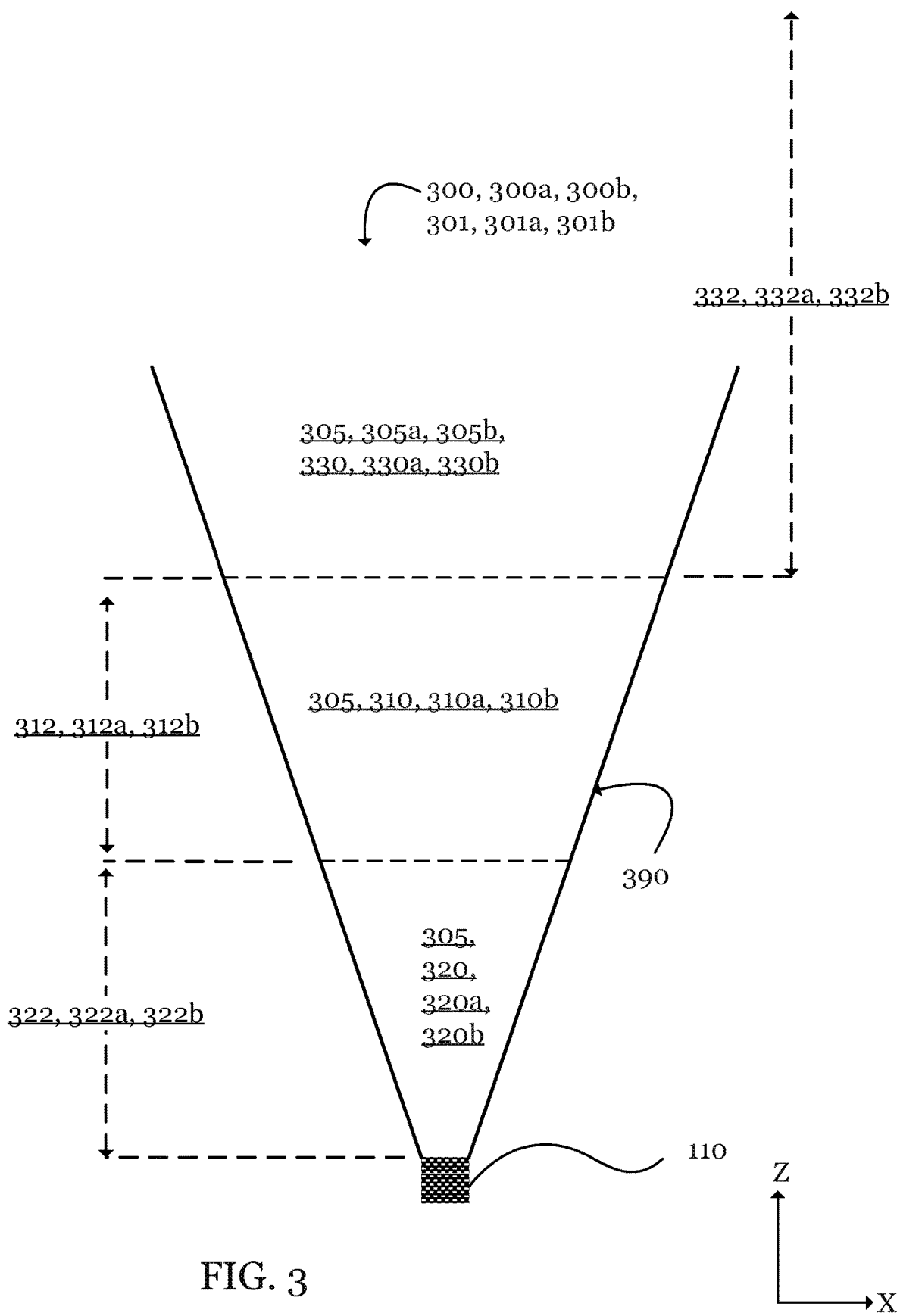
FIG. 3 shows exemplary optical fields for a first general optical state. The optical state, and therefore the optical fields, can be natural or artificial.
Figure 4:
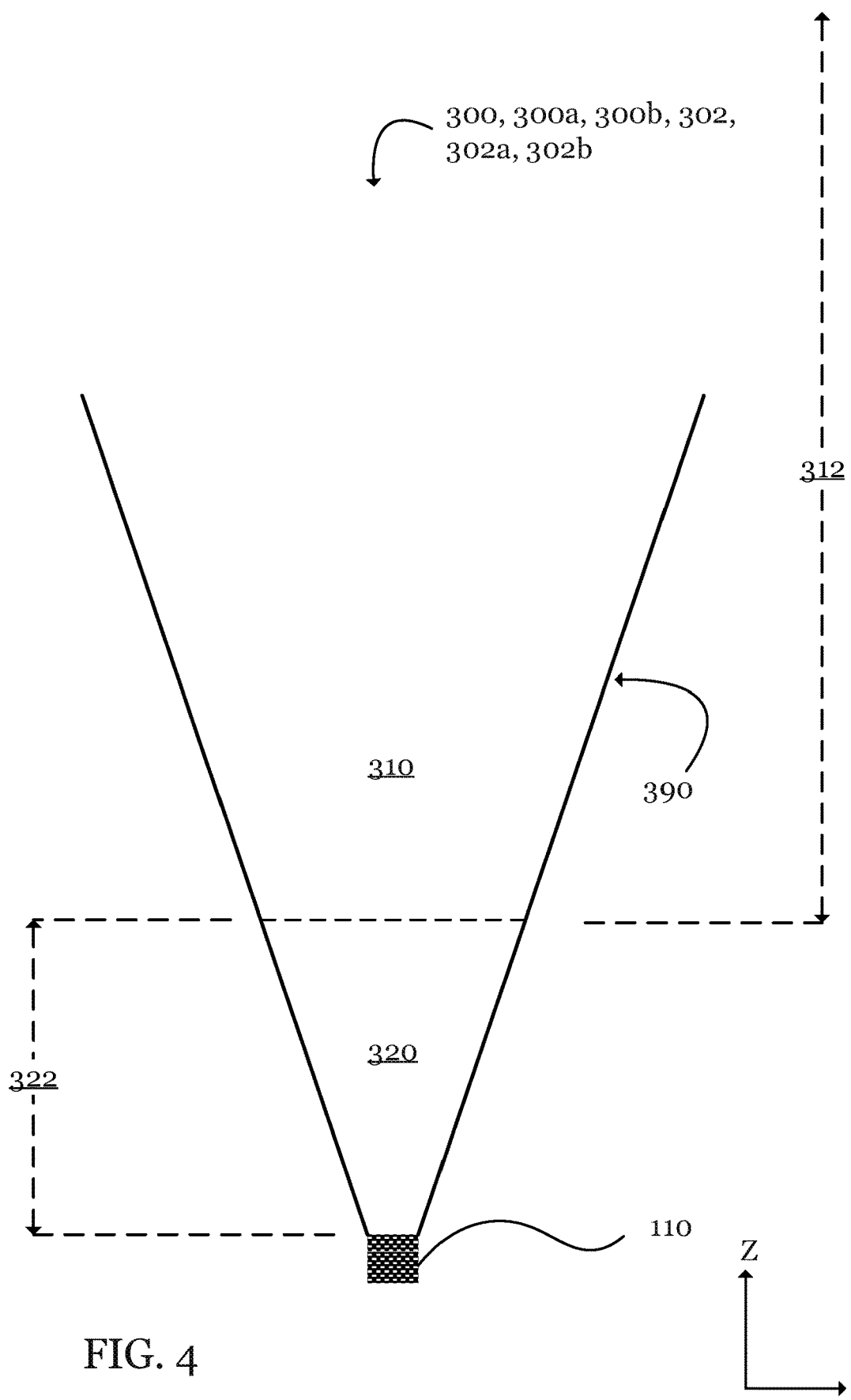
FIG. 4 shows the same for a second general optical state.
Figure 5:
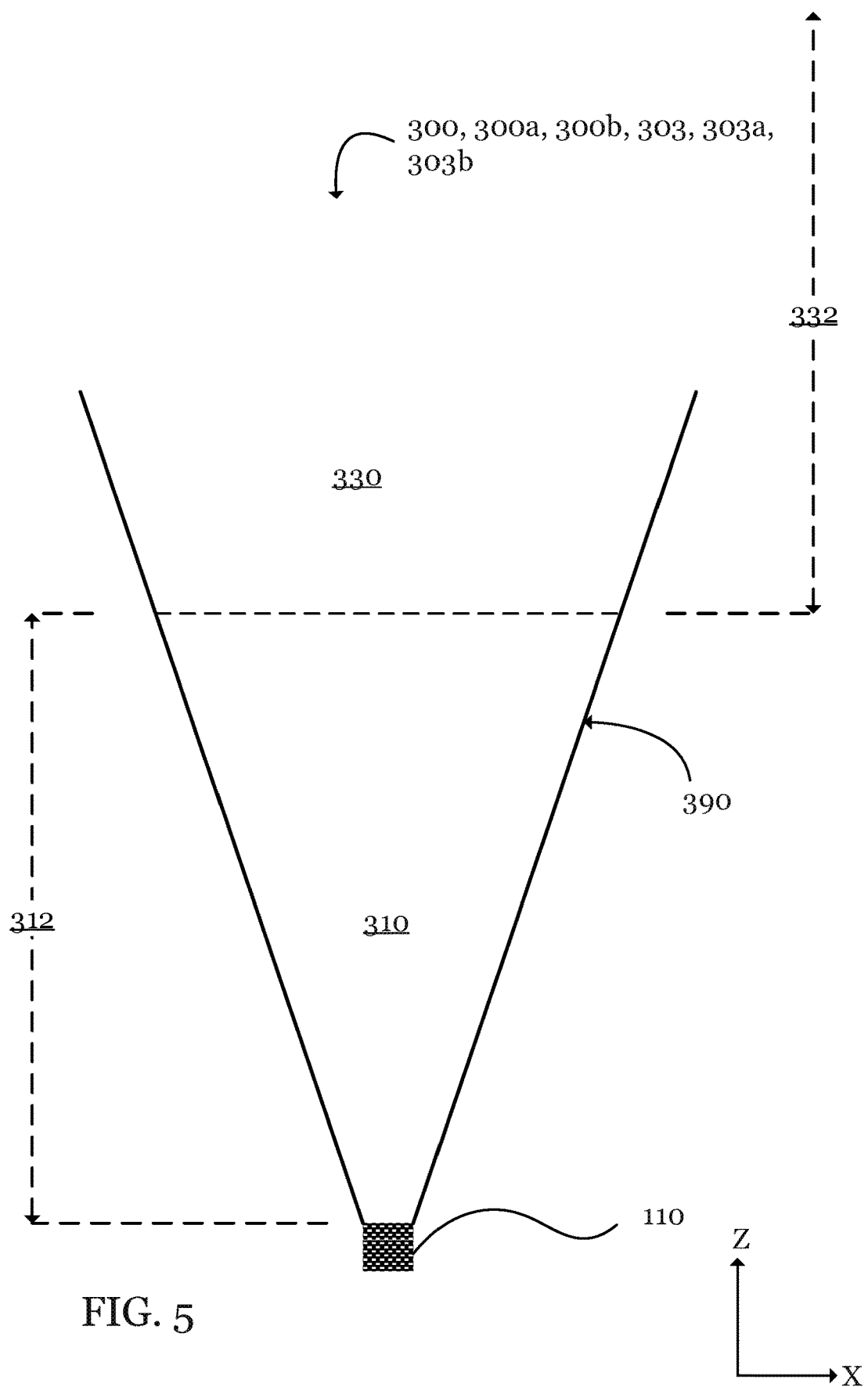
FIG. 5 shows the same for a third general optical state.

FIGS. 3-5 are a schematic plan views of optical states 300. Each optical state 300 can be natural 300*a* or artificial 300*b* (further discussed below). FIG. 3 shows a first optical state 301, which can be natural 301*a* or artificial 301*b*. FIG. 4 shows a second optical state 302, which can be natural 302*a* or artificial 302*b*. FIG. 5 shows a third optical state 303, which can be natural 303*a* or artificial 303*b*. Camera 110 can attain natural optical states 300*a* other than those shown in FIGS. 3-5. PS 600 can generate artificial optical states 300*b* other than those shown in FIGS. 3-5.

A natural optical state 300*a* can exhibit the configuration of optics 210 at image capture, and represents the light collected by the image sensor 220. An artificial optical state 300*b* can be one that PS 600 has simulated (e.g., via post-processing). For example, PS 600 can convert a first image exhibiting the natural optical state 300*a* of camera 110 at the time of capture (called a depth-natural image 1342) into a second image simulating an artificial optical state 300*b* of camera 110 at the time of capture (called a depth-artificial image 1382). As discussed below, PS 600 can perform the conversion with a depth-map such as a phase-disparity map.

Referring to FIGS. 3-5, each optical state 300 can include optical fields 305 including field-of-focus 310, defocused foreground 320, and/or defocused background 330. A natural optical state 300*a* can have natural optical fields 305*a*, 310*a*, 320*a*, 330*a*. An artificial optical state 300*b* can have artificial optical fields 305*b*, 310*b*, 320*b*, 330*b*. Although not shown, other optical states are possible. For example, one optical state can consist of defocused foreground 320. Another can consist of field-of-focus 310. Another can consist of defocused background 330.

An optical state 300 can define dimensions for each optical field 305. Field-of-focus 310 can define field-of-focused depth range 312. Defocused foreground 320 can define defocused foreground depth range 322. Defocused background 330 can define defocused background depth range 332. Each depth range can be natural 312*a*, 322*a*, 332*a* (corresponding to a natural optical state 300*a*) or artificial 312*b*, 322*b*, 332*b* (corresponding to an artificial optical state 300*b*). Some optical fields 305 can have the same depth ranges in both a depth-natural image 1342 and a depth-artificial image 1382.

A general optical state can define the relative order of optical fields 305. A specific optical state can define optical field dimensions 312, 322, 332 for a general optical state. For example, the general optical state 302 shown in FIG. 4 can have a specific optical state with defocused foreground 310 extending from 0-10 meters and another specific optical state with defocused foreground 310 extending from 0-11 meters. Therefore, FIGS. 3-5 can each show a different general optical state 301, 302, 303.

Camera 110 can be configured to occupy any natural optical state 300*a*. Camera 110 can be permanently fixed in any natural optical state 300*a*. Camera 110 can be configured to occupy only some natural optical states 300*a*. For example, camera 110 can be configured such that it can occupy first 301 and second 302, but not third 303, natural optical states 300*a*.

Camera 110 can be configured to naturally occupy only one, only two, or all three general natural optical states 301*a*, 302*a*, 303*a*. Camera 110 can be configured to vary the specific optical state (e.g., via autofocus to adjust the dimensions of optical fields 305) while remaining in any general natural optical state 301*a*, 302*a*, 303*a*. Camera 110 can be configured to assume a natural optical state 300*a* other than general natural optical states 301*a*, 302*a*, 303*a*. Camera 110 can include or lack autofocus and include or lack an adjustable aperture. If camera 110 is equipped with autofocus, the autofocus can be phase detection autofocus.

Figure 7:
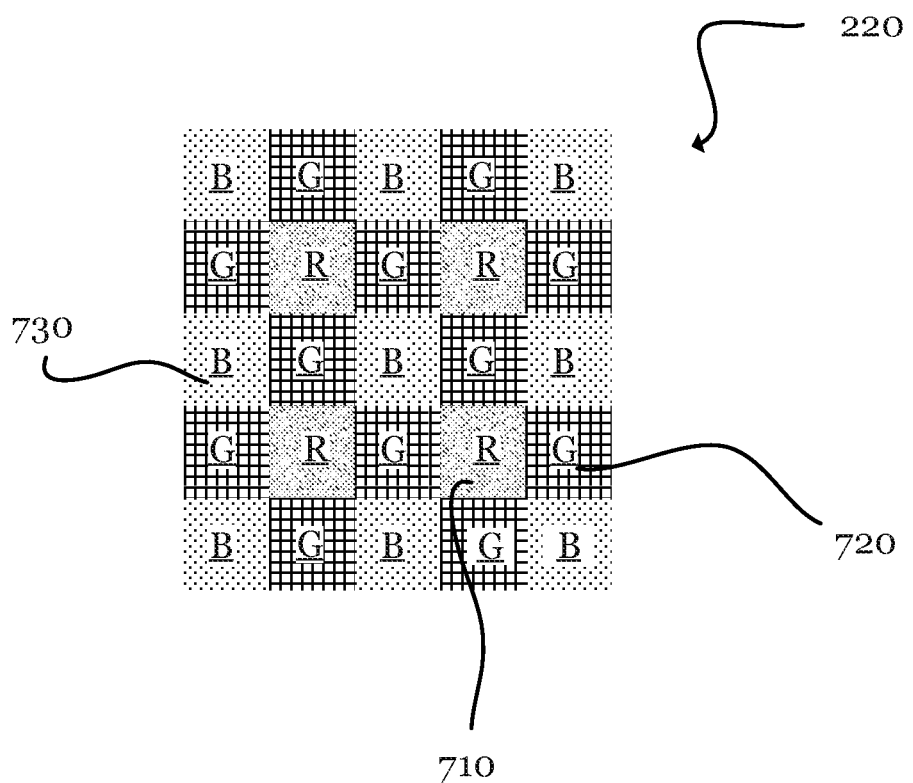
FIG. 7 is a schematic and plan view of an exemplary image sensor.

Referring to FIG. 7, image sensor 220 can include a plurality of sensor pixels 700. Each sensor pixel 700 can include a color filter and one or more photodiodes (not shown in FIG. 7) configured to measure light passed through the color filter. As used herein, the term "photodiode" is not limited to CMOS photosensors and can include, for example, CCD photosensors. Sensor pixels 700 can include other features. For example, each sensor pixel 700 can include a common microlens configured to converge light onto the photodiode(s) of the sensor pixel 700, shielding applied over the photodiode(s), and so on.

Image sensor 220 can include red (also called "first"), green (also called "second"), and blue (also called "third") sensor pixels 710, 720, 730. The color of a sensor pixel 700 can identify the color of its filter. Besides color filter, each sensor pixel 700 can share the same structure.

As used herein the term "color" is not limited to human-visible colors. "Color" can refer to non-human-visible light spectrum (e.g., infrared). Although red, green, and blue are used throughout the description, these colors are only examples and can be respectively replaced with "first color", "second color", and "third color".

Figure 8:
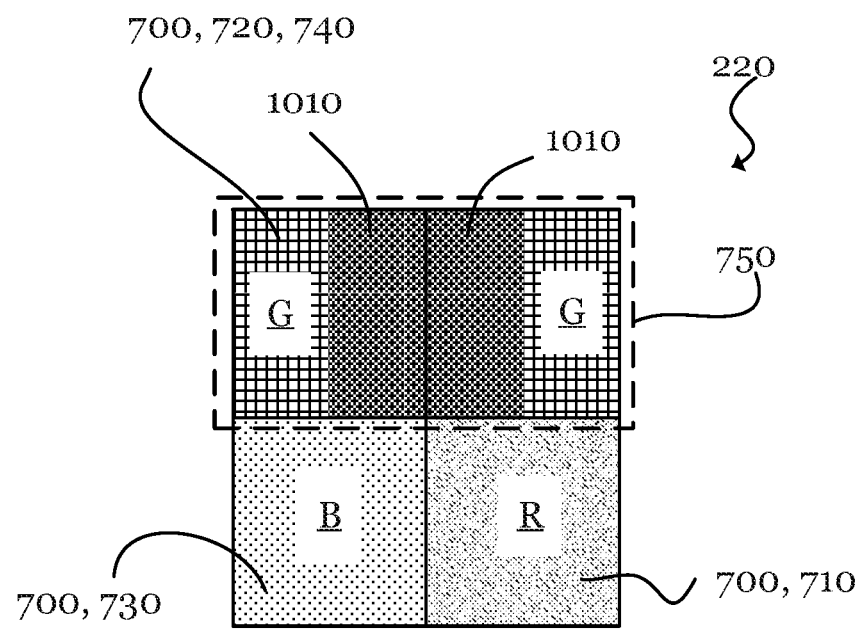
FIG. 8 is a schematic and plan view of an exemplary image sensor.

At least some of the sensor pixels 700 can be configured for phase detection. PS 600 can use phase detection sensor pixels 740 to perform phase-detection autofocus. Phase detection sensor pixels 740 can be made by shielding adjacent sensor pixels of the same color filter (e.g., a Bayer with phase detection color filter array). In FIG. 8, image sensor 220 includes green phase detection sensor pixels 700, 710, 740 (with 700 indicating "sensor pixel", 720 indicating "green" and 740 indicating "phase detection") forming a phase detection pair 750. Shielding 810 partially covers the single photodiode (not shown but can be centrally disposed in each pixel 700) of each pixel 740.

Figure 9:
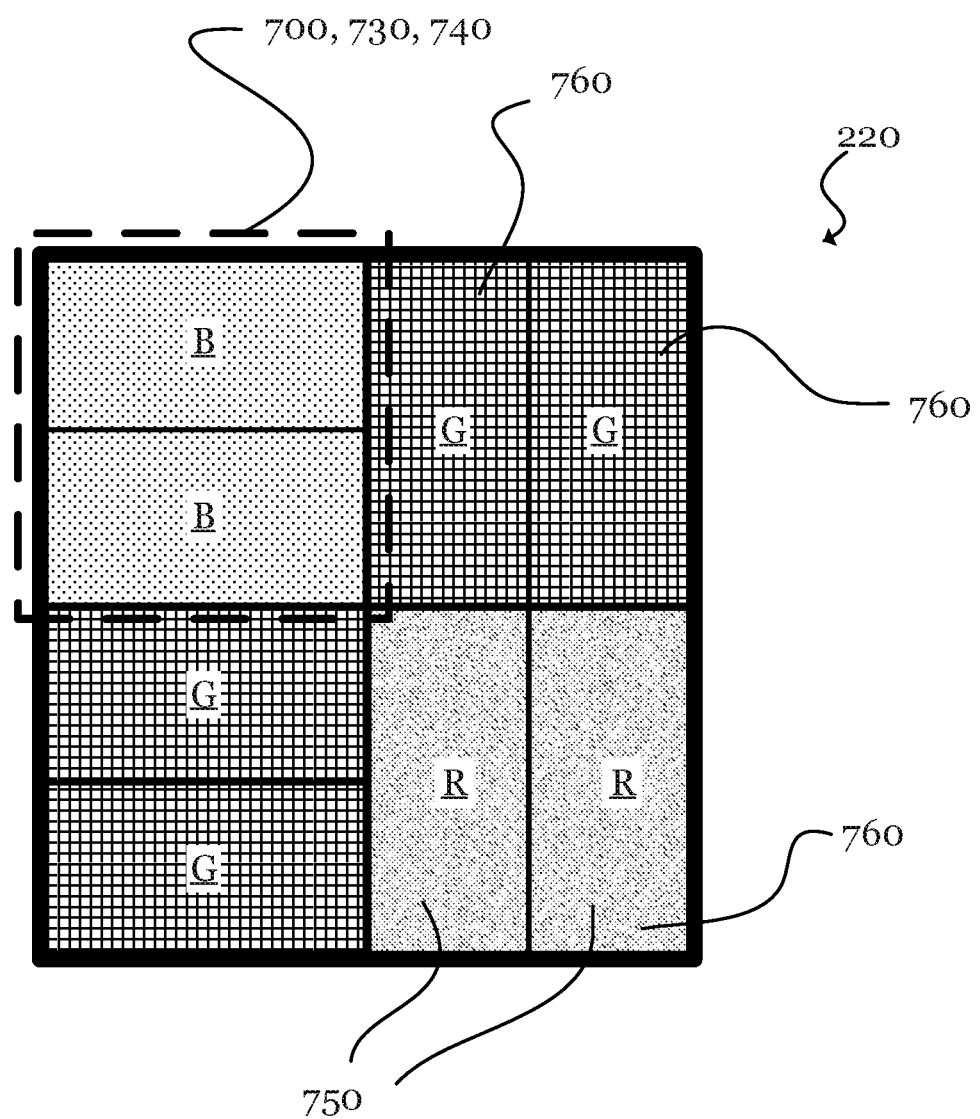
FIG. 9 is a schematic and plan view of an exemplary image sensor.

Alternatively, or in addition, phase detection sensor pixels 700, 740 can each include multiple photodiodes 760. Referring to FIG. 9, each sensor pixel 700 of image sensor 220 can include two photodiodes 760. A broken line reference box is drawn around a blue phase detection sensor pixel 700, 730, 740 (with 700 indicating "sensor pixel", 730 indicating "blue", and 740 indicating "phase detection").

Figure 11:
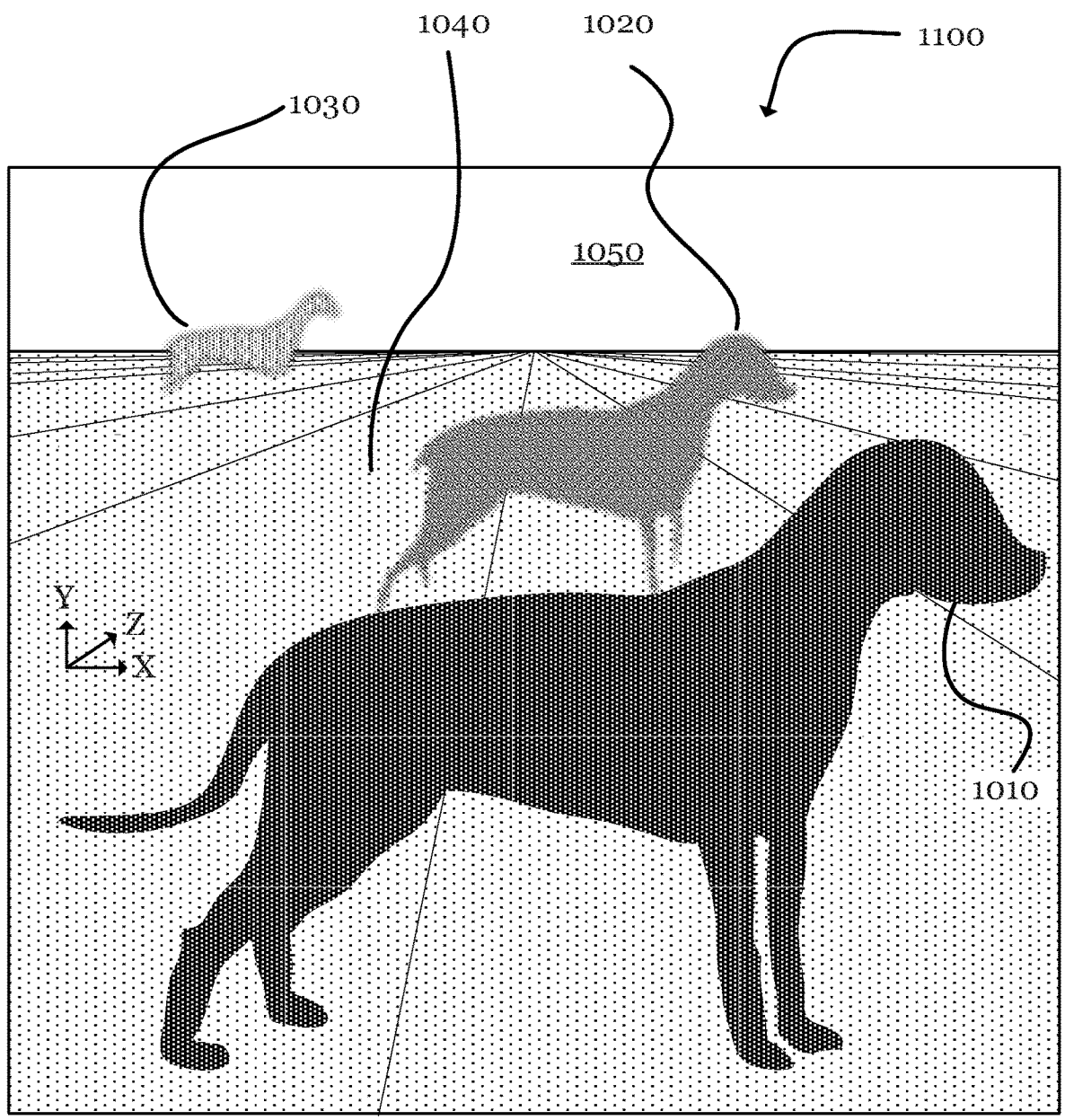
FIG. 11 schematically shows a depth-artificial transformation of the depth-natural image in FIG. 10.

Some photodiodes 760 can be arranged horizontally. Others can be arranged vertically. In FIG. 11, the two photodiodes 760 of a sensor pixel 700 can function as a phase-detection pair 750. Although not shown, each phase detection sensor pixel 740 can include any number of photodiodes 760 (e.g., four photodiodes).

PS 600 can capture phase-disparity with phase detection sensor pixels 740. PS 600 can assemble the captured phase-disparities in a phase-disparity map. PS 600 can convert a depth-natural image 1000 (FIG. 10), 1342 (FIG. 13) into a first depth-artificial image 1100, 1200, 1382 (FIGS. 11, 12, and 13) based on the depth-map.

Phase-disparity is a proxy for depth (along the (Z) axis). The terms are used synonymously throughout the application. For example, "phase-disparity" maps 1362, 1372 can be called "depth" maps 1362, 1372, and "phase-disparity" values 1364, 1374 can be called "depth" values 1364, 1374.

Figure 10:
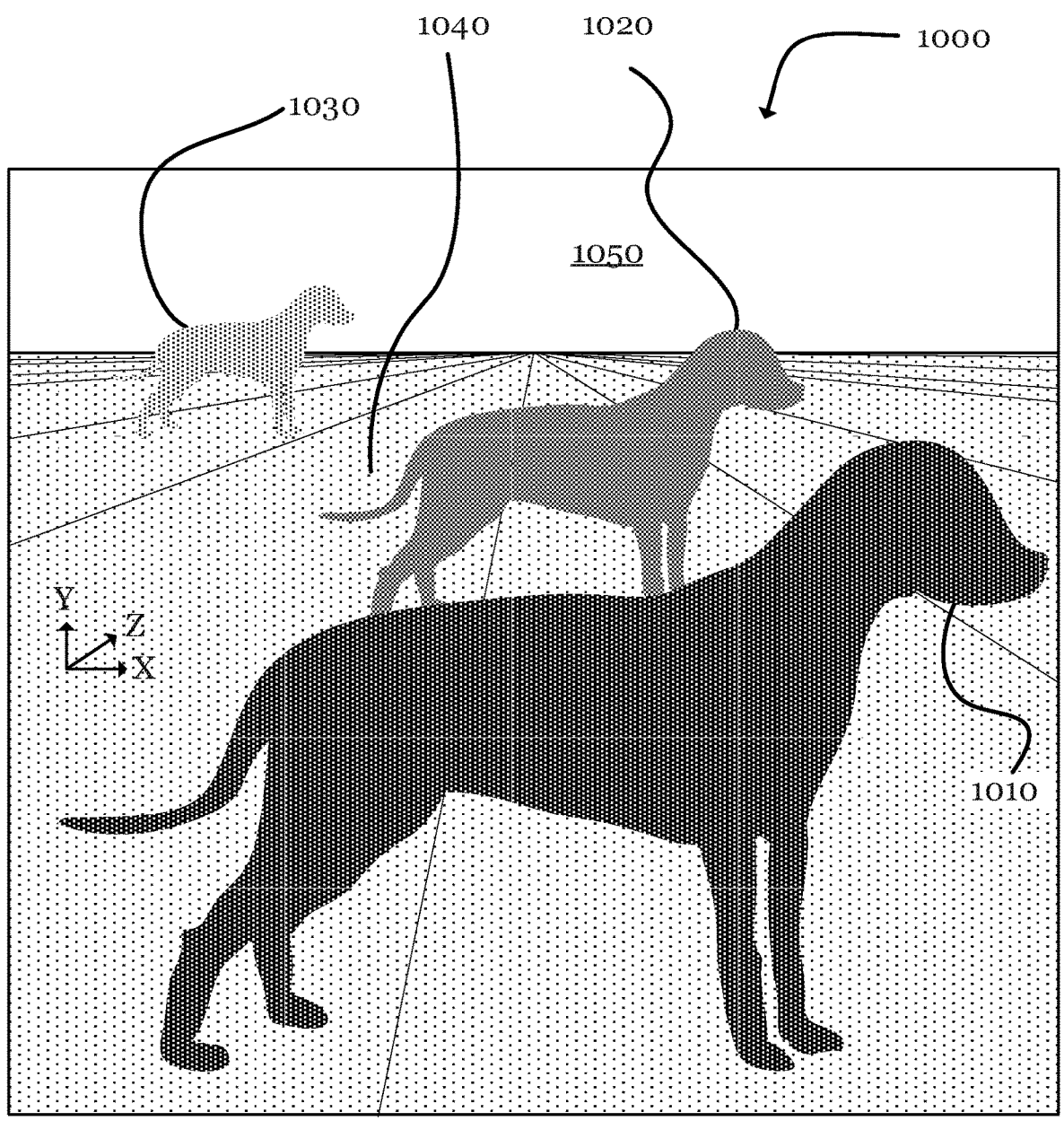
FIG. 10 schematically shows a depth-natural image depicting three dogs, grass, and sky.
Figure 12:
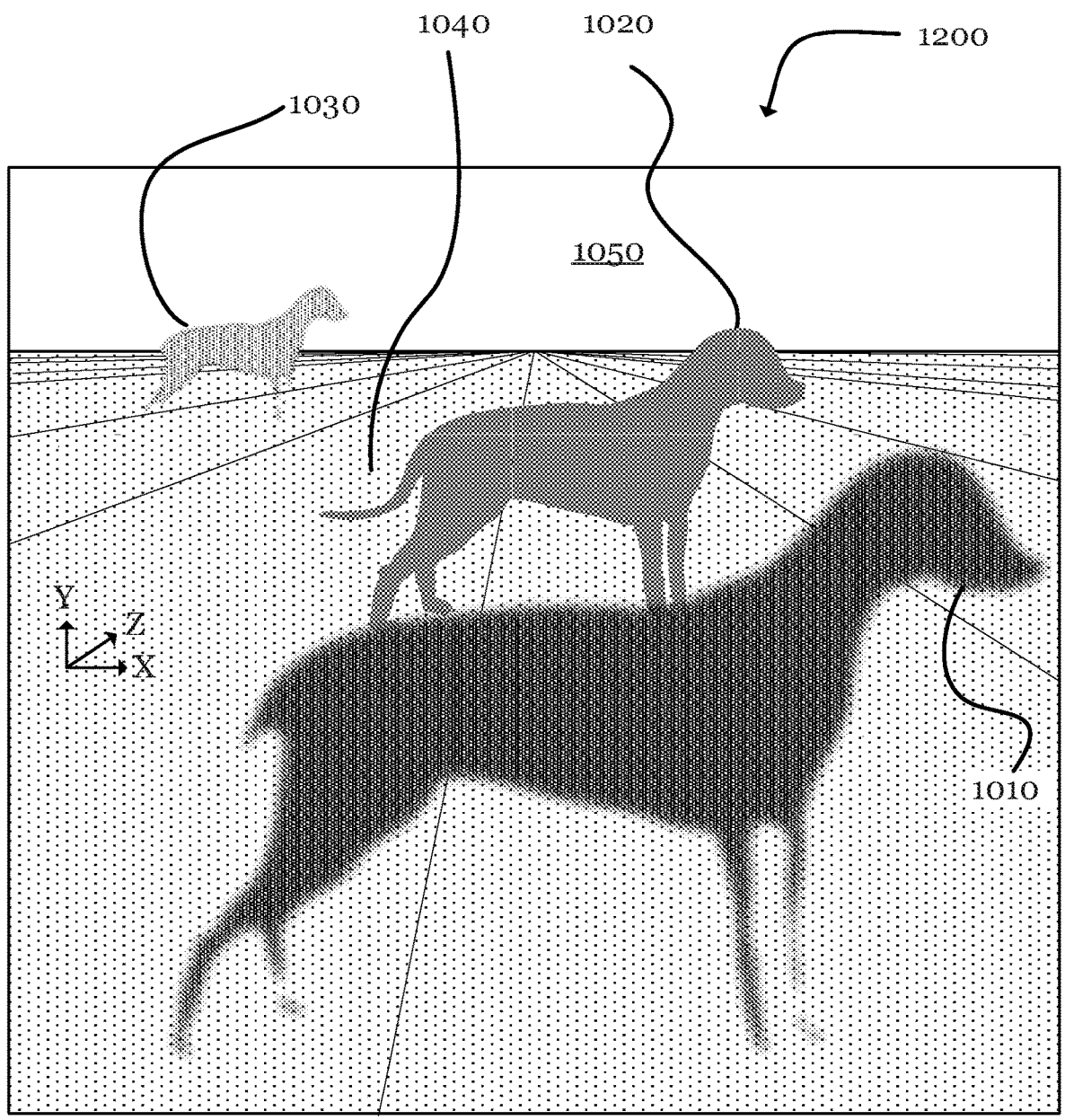
FIG. 12 schematically shows a different depth-artificial transformation of the depth-natural image in FIG. 10.

FIG. 10 shows an illustrative depth-natural first image 1000, 1342. First image 1000 can exhibit natural optical state 300*a* of camera 110 at the time of capture. FIG. 11 shows an illustrative depth-artificial second image 1100, 1482. FIG. 12 shows an illustrative depth-artificial third image 1200, 1482. Depth-artificial image second and third images 1100, 1200 can each exhibit a different artificial optical state 300*b*.

In FIGS. 10-13, each image 1000, 1100, 1200 includes three dogs: near dog 1010, middle dog 1020, and far dog 1030. Near dog 1010 is 10 meters deep. Middle dog 1020 is 20 meters deep. Far dog 1030 is 30 meters deep. Dogs 1010, 1020, 1030 are standing on grass 1040. Sky 1050 is above the horizon. The unlabeled lines along grass 1040 convey depth and perspective.

Camera 110 captured depth-natural first image 1000 while in natural optical state 302*a* such that all dogs 1010, 1020, 1030 are crisp (i.e., in-focus) in depth-natural first image 1000. Although natural optical state 302*a* includes natural defocused foreground 320*a*, natural defocused foreground depth range 322*a* ended before near dog 1010.

The user may wish for a particular dog (e.g., near dog 1010) to be crisp and for the remaining dogs (e.g., middle and far dogs 1020, 1030) to be blurry. PS 600 can introduce (i.e., render, simulate, etc.) such an effect by transforming (i.e., converting) first depth-natural image 1000 into a depth-artificial second image 1100 (FIG. 11).

More specifically, a user can select an artificial optical state 300*b* placing (a) near dog 1010 in artificial field-of-focus 310*b* and (b) middle and far dogs 1020, 1030 in artificial defocused background 330*b*. In the (first) depth-artificial image 1382 exhibiting user selected artificial optical state 300*b*, (a) near dog 1010 can remain crisp (by virtue of remaining in field-of-focus 310), while middle and far dogs 1020, 1030 can become blurry (by virtue of moving from field-of-focus 310 in the natural optical state 300*a* to defocused background 330 in the artificial optical state 300*b*). PS 600 can rely on depth data (e.g., phase-disparity data) to perform the transformation. The depth data can be extracted from phase detection sensor pixels 740, as further discussed below.

Due to the above described depth-transformation, depth-artificial second image 1100 (FIG. 11), shows middle and far dogs 1020, 1030 as blurry and near dog 1010 as crisp. Blurring of grass 1040 and sky 1050 is omitted throughout the Figures for the reader's convenience.

Depth-artificial third image 1200 (FIG. 12) resulted from a different depth-transformation of depth-natural first image 1000. Here, the user transformed image 1000 (FIG. 10) exhibiting natural optical state 302*a* (FIG. 4) into image 1200 exhibiting artificial optical state 301*b* (FIG. 3). The dimensions of artificial optical state 301*b* transfer near dog 1010 from natural field-of-focus 310*a* to artificial defocused foreground 320*b* and far dog 1030 from natural field-of-focus 310*a* to artificial defocused background 330*b*. Middle dog 1020 is in both natural and artificial field-of-focus 310*a*,*b*. As a result, near dog 310 and far dog 330 are blurry (i.e., defocused) while middle dog 320 is crisp. The depth-natural image 1000 in FIG. 10 has a large depth of field with all three dogs 1010, 1020 and 1030 in focus. The depth-artificial images in FIGS. 11 and 12 both appear to have a shallow depth of field. Depth-artificial image 1100 in FIG. 11 creates the appearance that the near dog 1010 is nearest to the focal plane and is in sharpest focus, and depth-artificial image 1200 in FIG. 12 creates the appearance that the middle dog 1020 is nearest to the focal plane and is in sharpest focus.

PS 600 can be configured to generate a depth-artificial image exhibiting any desired artificial optical state 300*b* from a depth-natural image exhibiting any natural optical state 300*a*. Embodiments of PS 600 enable a user to numerically enter (a) an artificial field-of-focus depth range 312 (e.g., 10-20 meters), (b) an artificial defocused foreground depth range 322 (e.g., 0-10 meters), and (c) an artificial defocused background depth range 332 (e.g., 20-infinity meters). The user can enter OFF or "zero depth range" for any of (a), (b), and (c).

When the present application discusses a user selection, the user can be a person and the selection can be via a corresponding menu presented on display 120. Alternatively, the user can be PS 600 and the selection can be automatic. Therefore, embodiments enable PS 600 to automatically select the above-discussed artificial depth ranges 312*b*, 322*b*, 332*b* based on an external input (e.g., a classification of objects appearing in the depth-natural image with a neural network).

Although natural optical state 300*a* can be limited by the optical components physically within camera 110, an artificial optical state 300*b* can have any form, even those that would be impractical/impossible to physically generate with traditional optics. For example, PS 600 can be configured to generate a first depth-artificial image 1382 reflecting user-selection of: multiple non-consecutive (i.e., non-contiguous) artificial fields-of-focus 310*b*, multiple non-consecutive artificial defocused foregrounds 320*b*, and/or multiple non-consecutive artificial defocused backgrounds 330*b*. An example is artificial field-of-focus at 0-10 m, artificial defocused foreground/background at 10-12 m, artificial field-of-focus at 12-20 m, artificial defocused foreground/background at 20-30 m, and artificial field-of-focus at 30-infinity meters.

Figure 13:
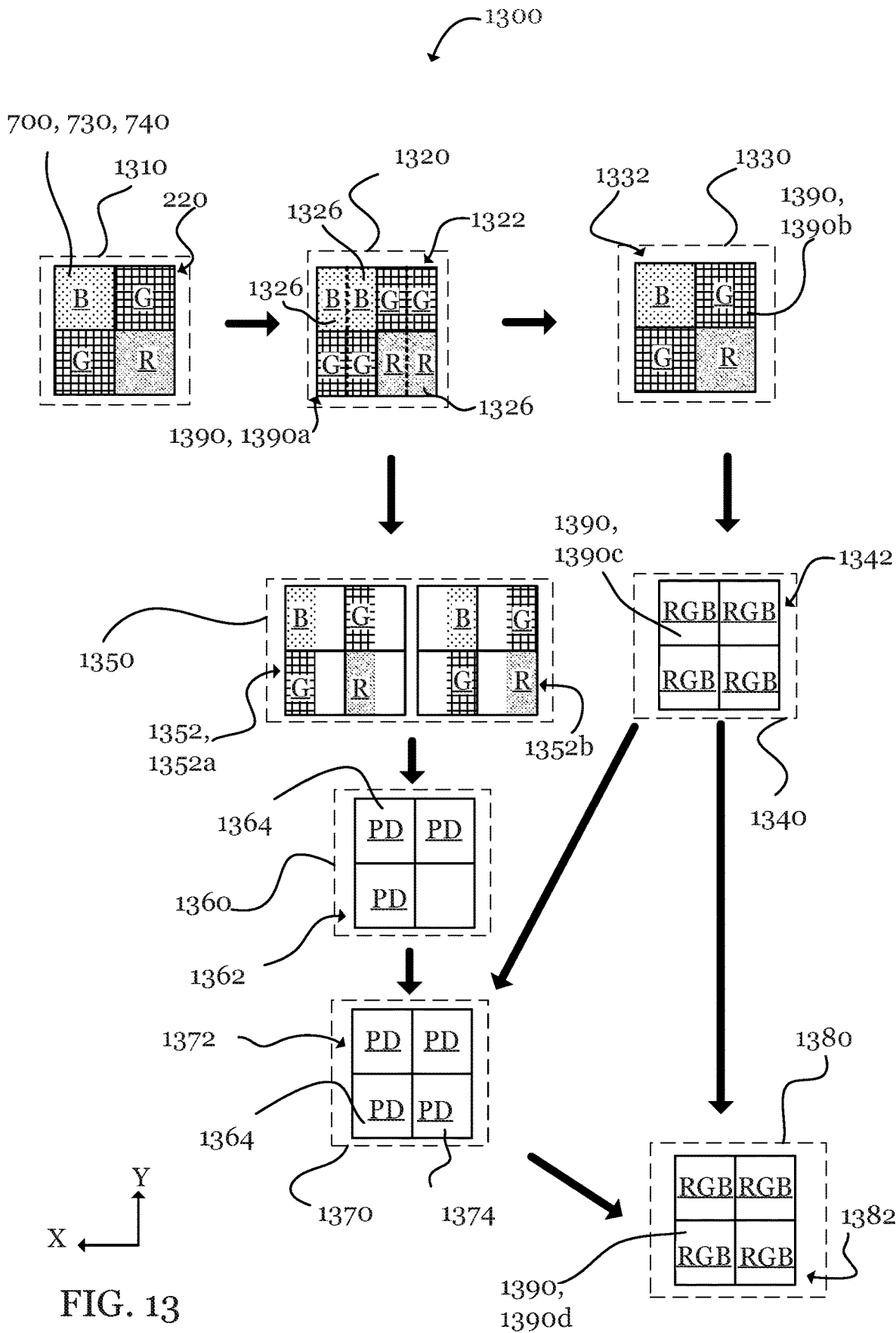
FIG. 13 shows a block diagram of a method.

PS 600 can perform the above-described depth-transformations with method 1300 (FIG. 13—discussed below). Method 1300 can rely on image pixels 1390. Image pixels 1390 can be units of resolution of an image. Each sensor pixel 700 can map (i.e., correspond) to one image pixel 1390. Each image pixel 1390 can quantify the view from a corresponding sensor pixel 700 with color channels and color values.

Color channels can conform to a predetermined color space. For example, RGB color space includes three color channels (red, green, and blue). A color value quantifies magnitude or brightness of a particular color channel. Put differently, a color value of an image pixel 1390 quantifies the brightness of light with the same color channel incident on the corresponding sensor pixel 700 at the time of capture. Through color values, an image pixel 1390 can take on any color. For example, an image pixel can take on purple with RGB color values of (100, 0, 100).

Camera 110 may be unable to measure more than one color channel per sensor pixel 700. For example, blue sensor pixels 730 may only be able to capture blue, but not red or green, color values. Therefore, image sensor 220 can originally capture an image as a "mosaic", where each image pixel 1390 has only one color channel.

When in mosaic form, the single color channel of an image pixel 1390 can be the same as the color filter in the corresponding sensor pixel 700. Therefore, when an image is in a mosaic form, each image pixel 1390 mapping to a red sensor pixel 710 can only have a red color channel, each image pixel 1390 mapping to a green sensor pixel 720 can only have a green color channel, and each image pixel 1390 mapping to a blue sensor pixel 730 can only have a blue color channel.

An image may be unrecognizable or confusing when in mosaic form. Therefore, PS 600 can be configured to convert an image in a mosaic state to a full-color state. This process is called demosaicing and can include assigning missing color channels to each image pixel 1390 based on the known color channels of neighboring image pixels 1390. As stated above, although red, green, and blue are discussed in the present disclosure, PS 600 can take advantage of the concepts disclosed herein when operating in any color space (e.g., infrared, black and white, etc.). Therefore, any instance of the terms "red", "blue", and "green" can be replaced with "first", "second", and "third" respectively.

When the present disclosure refers to an image, the image can be a portion or patch of a larger image. Alternatively, the image can represent an entire and complete image.

Referring to method 1300 of FIG. 13, PS 600 can generate a depth-natural full-color image 1342 (e.g., image 1000) and a phase-disparity map (also called a "depth-map") 1372. Depth-natural image 1342 can reflect the natural optical state 300*a* of camera 110.

PS 600 can blur (also called "defocus") at least a portion of a depth-natural image 1342 based on phase-disparity map 1372 to create a depth-artificial image 1382 (e.g., images 1100 and 1200). With phase-disparity map 1372, PS 600 can determine (e.g., approximate, estimate) the depth of each image pixel 1390.

While performing method 1300, PS 600 can compare the depths (e.g., phase-disparities) of image pixels 1390 with the depth ranges of the artificial optical fields 305*b*. In some embodiments, PS 600 determines whether to blur (i.e., defocus) or retain an image pixel 1390 based on an outcome of the comparison.

For example, if an image pixel 1390 has a depth within the artificial field-of-focus 310*b*, then PS 600 can retain the color values of the image pixel 1390. As a result, scene objects having a depth within the desired field-of-focus depth range can remain sharp in the depth-artificial image 1382.

If the depth of an image pixel 1390 is outside artificial field-of-focus 310*b*, then PS 600 can blur the image pixel 1390. PS 600 can blur an image pixel 1390 by blending the color values of an image pixel 1390 with color values of neighboring image pixels 1390. By performing this process across depth-natural image 1342, PS 600 can transform depth-natural image 1342 (e.g., image 1000) into depth-artificial image 1382 (e.g., images 1100 and 1200).

Recall that the terms "phase-disparity" and "depth" are used interchangeably herein. However, depth-related features can have a phase disparity basis, but can also have a basis in other three-dimensional imaging techniques (e.g., stereoscopy, infrared range-finding).

At block 1310 of method 1300, image sensor 220 can measure (e.g., capture, quantify) incident light with sensor pixels 700. At least some sensor pixels 700 can be phase detection sensor pixels 740. In FIG. 13, each sensor pixel 700 can have two horizontally arranged photodiodes 760. However, method 1300 can rely on any kind of phase detection sensor pixels 740. For example, method 1300 can rely on shielded phase detection sensor pixels 740, as further discussed below.

At block 1320, PS 600 can compile the measurements from sensor pixels 700 into a first mosaic 1322. In some embodiments, first mosaic 1322 has a higher resolution than a second mosaic 1332 (discussed below). First mosaic 1322 can include image pixels 1390 in a first state (e.g., each image pixel 1390 can be a single color channel with one color values).

For image pixels 1390 mapping to multi-photodiode sensor pixels 700, each image pixel 1390 can include one or more sub-pixels 1326 when in first mosaic 1322. The relative arrangement of sub-pixels 1326 can reflect the relative arrangement of photodiodes in the corresponding sensor pixel 700. Therefore, each sub-pixel 1326 can map to one photodiode of a corresponding sensor pixel 700. Although sub-pixels 1326 are shown as being horizontally divided, other arrangements can be used (e.g., vertically divided to reflect vertically arranged photodiodes, divided into quadrants to reflect four photodiodes per pixel, and so on). As further explained below, some embodiments omit sub-pixels 1326.

At block 1330, PS 600 can generate second mosaic 1332 from first mosaic 1322. For example, PS 600 can generate lower-resolution second mosaic 1332 by binning first mosaic 1322 (e.g., if first mosaic has a higher resolution than second mosaic). Second mosaic 1332 can include image pixels 1390 in a second state 1390*b* (e.g., one color channel and one color value).

At block 1340, PS 600 can perform demosaicing to convert second mosaic 1332 into depth-natural full-color image 1342 (e.g., image 1000). Demosaicing can include remosaicing, full-color interpolation, color rebalancing, and so on. Each image pixel 1390 can now be in a third state 1390*c* (e.g., three color channels each having one color value).

At block 1350, PS 600 can break first mosaic 1322 into a plurality of partial mosaics 1352. Each partial mosaic 1352 can represent one perspective of a scene. For example, partial mosaic 1352*a* can be a right-hand view of a scene while partial mosaic 1352*b* can be a left-hand view of the scene. In FIG. 13, "left" and "right" are reversed, since FIG. 13 looks toward image sensor 220, whereas other Figures look away from image sensor 220 and toward the scene.

PS 600 can build the partial mosaics 1352 by duplicating higher resolution mosaic 1322, then removing some of the sub-pixels 1326 from each copy. For example, PS 600 can build partial mosaic 1352*a* by removing all of the left-side sub-pixels 1326 from a first copy of first mosaic 1322 and PS 600 can build partial mosaic 1352*b* by removing all of the right-side sub-pixels 1326 from a second copy of first mosaic 1322.

At block 1360, PS 600 can build an original phase-disparity map 1362 based on partial mosaics 1352. Original phase-disparity map 1362 can quantify phase-disparity (i.e., depth) at some or all regions (e.g., image pixels or clusters thereof) of the depth-natural image 1342.

Original phase-disparity map 1362 (i.e., original depth-map) can thus include a plurality of original phase-disparities 1364 (i.e., "depths"). Each original phase-disparity 1364 can apply to a single image pixel 1390 or a plurality of clustered image pixels 1390 (not shown) and quantify a distance from the object contained in the single image pixel 1390 to camera 110 at the time of capture. Original phase-disparity map 1362 is shown as missing an original phase-disparity 1364 for reasons that are addressed below.

At block 1370, PS 600 can refine (e.g., supplement) original phase-disparity map 1362 to generate a refined phase-disparity map 1372 (i.e., a refined depth-map). PS 600 can generate refined phase-disparity map 1372 based on original phase-disparity map 1362 and depth-natural image 1342.

Refined phase-disparity map 1372 can include original phase-disparities 1364 and supplemented phase-disparities 1374. Supplementary phase-disparities 1374 can be disposed in coordinates where original phase-disparity map 1362 was missing an original phase-disparity 1364.

Supplementary phase-disparities 1374 can replace low-confidence original phase-disparities 1364 (confidence is discussed below). PS 600 can compute supplementary phase-disparities 1374 by interpolating original phase-disparities 1364 (e.g., original phase-disparities 1364 having high confidences). The interpolating can rely on depth-natural image 1342 (e.g., edges present in depth-natural image 1342). As discussed below, interpolation can occur until each unit of resolution in refined phase-disparity map 1372 (which can be an image pixel 1390 or a cluster thereof) includes an original 1364 or supplementary 1374 phase-disparity.

A depth-map (e.g., depth-maps 1362, 1372) can include an X, Y, and Z axis. See FIG. 21 (further discussed below), which is an example depth-map of depth-natural image 1000. The Z axis can quantify depth (e.g., phase-disparity). The X and Y axes can map to an image (e.g., depth-natural image 1342).

If the X and Y axes share the same scale as the X and Y axes of the image, then each coordinate in the depth-map can map to one image pixel 1390 in the depth-natural image. Alternatively, the depth-map can be downsampled such that each coordinate in the depth-map maps to a plurality of image pixels 1390 in the depth-natural image. Because a depth-map can be thought of as adding a depth dimension to each image pixel 1390 in the depth-natural image 1342, each X-Y coordinate in a depth-map can be thought of as an image pixel or a cluster/group thereof (depending on the presence of downsampling).

At block 1380, PS 600 can generate a depth-artificial full-color image 1382 (e.g., images 1100 and 1200) based on refined phase-disparity map 1372 and depth-natural image 1342. Each image pixel 1390 can be in a fourth state 1390d (e.g., each image pixel 1390 can have three color values for three color channels).

Image pixels 1390 within the natural field-of-focus 3100a (in depth-natural image 1342) and the artificial field-of-focus 310b (in depth-artificial image 1382) can have the same third and fourth states. Image pixels 1390 within the natural field-of-focus 310a and the artificial defocused foreground 320b can have different third and fourth states, where the third state is crisp and the fourth state is blurred. Image pixels 1390 within the natural field-of-focus 310a and the artificial defocused background 330b can have different third and fourth states, where the third state is crisp and the fourth state is blurred.

For an image pixel 1390 in the natural field-of-focus 310, the magnitude of its blurring can be based on (a) a difference between its depth 1364 and the artificial field-of-focus 310 and/or (b) the nature of its defocused artificial optical field 305b. For example, image pixels 1390 transferring from natural field-of-focus 310a to artificial defocused foreground 320b can experience a first kind of blurring and image pixels 1390 transferring from natural field-of-focus 310a to artificial defocused background 330b can experience a second kind of blurring.

Image pixels 1390 in both natural and artificial defocused foreground 320a, 320b can be unmodified. Alternatively, these image pixels 1390 can be blurred based on the difference between (a) depth 1364 and natural field-of-focus 310a and/or (b) depth 1364 and artificial field-of-focus 310b. The same applies to image pixels 1390 in natural and artificial defocused background 330a, 330b.

As with all features disclosed herein, the horizontal dual-photodiode 760 configuration of image sensor 220 in FIG. 13 is only illustrative. Phase-disparity can be captured in many different ways. For example, method 1300 can rely on an image sensor 220 with the shielded configuration shown in FIG. 8. In this case, the blocks of method 1300 can be the same, except for the following differences.

First, mosaics 1322 and 1332 can be identical (i.e., have the same resolution). Second, in some embodiments, only measurements from shielded sensor pixels 700 are incorporated into partial mosaics 1352a, 1352b. For example, only color values of image pixels 1390 mapping to shielded sensor pixels 1470 may appear in partial mosaics 1352a, 1352b. Color values from unshielded sensor pixels can be discarded for the purpose of creating partial mosaics 1352.

When performing the method 1300, PS 600 can enforce continuous blurring to prevent (i.e., discourage) duplicative blurring in artificial defocused foreground and/or background 320b, 330b. Continuous blurring is described with reference to FIG. 14.

Figure 14:
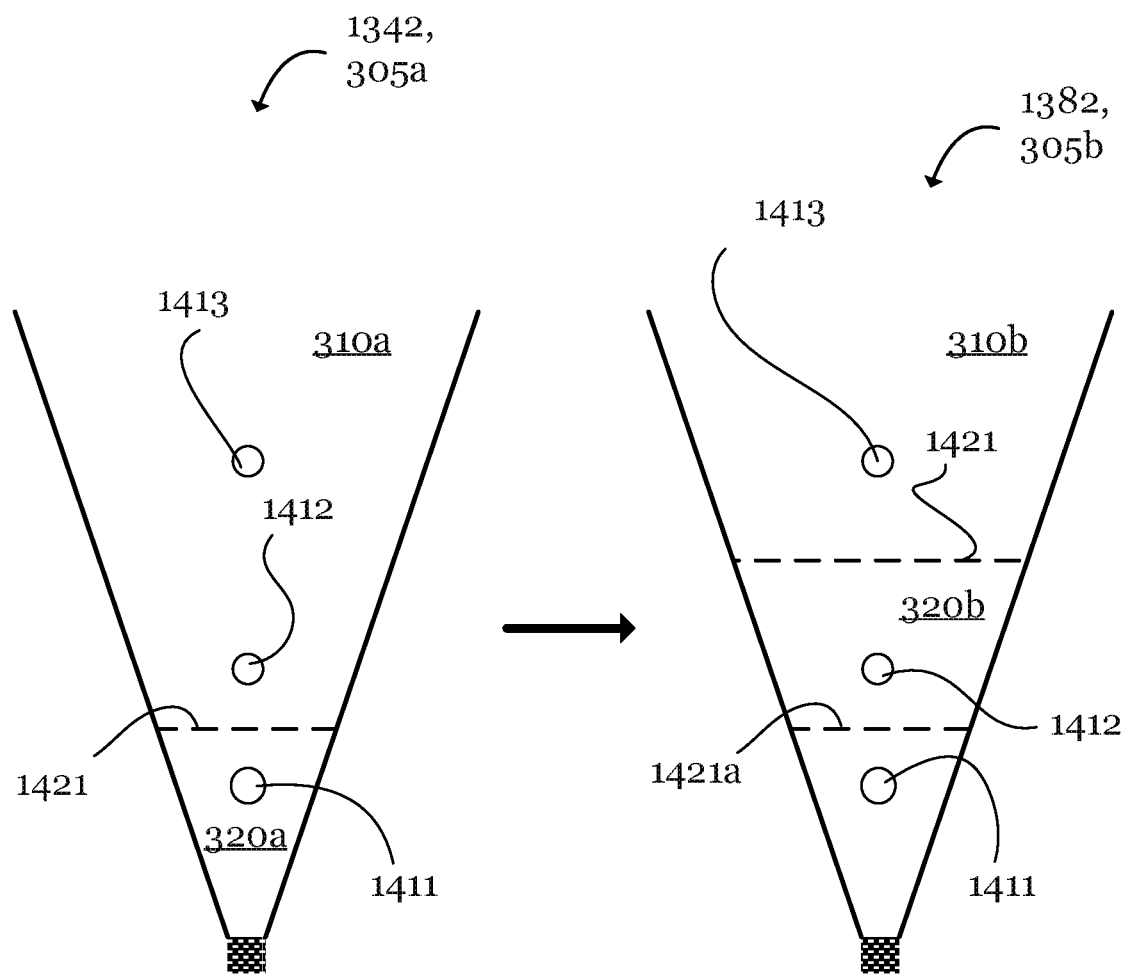
FIG. 14 schematically shows natural optical fields contained in a depth-natural image and artificial optical fields contained in a depth-artificial image.

FIG. 14 shows how scene objects 1411, 1412, 1413 (e.g., people, dogs, buildings, etc.) map to natural optical state 300a of depth-natural image 1342 and artificial optical state 300b of depth-artificial image 1382. Natural optical state 300a can include field-of-focus 310a and defocused foreground 320a. Artificial optical state 300b can include field-of-focus 310b and defocused foreground 320b. Images 1342, 1382 can both have the general optical state 302 (see FIG. 4), but different specific optical states (i.e., numerical depth ranges), which is reflected by the new position of optical boundary 1421 in depth-artificial image 1382.

PS 600 can retain the sharpness of object 1413 in depth-artificial image 1310 because scene object 1413 is located in artificial field-of-focus 310b. PS 600 can blur object 1412 for transferring from natural field-of-focus 310 to defocused foreground 320b. Object 1412 can be blurred based on its depth 1364 (e.g., phase-disparity) in relation to the depth of artificial field-of-focus 310b (e.g., the Z-axis distance between scene object 1412 and boundary 1421 in depth-artificial image 1382). PS 600 can blur object 1411 in the same manner (although object 1411, by virtue of being located further within artificial defocused foreground 320b may be blurred to a greater extent than object 1412)

However, by virtue of being disposed within natural defocused foreground 320a, object 1411 may have been captured with out-of-focus light in the plane of the image sensor 220. Therefore, if PS 600 applied the same general blurring algorithm to scene objects 1411 and 1412, scene object 1411 may experience over-blurring (i.e., duplicative blurring).

To avoid duplicative blurring, PS 600 can give scene object 1411 credit for being naturally blurred. PS 600 can reduce artificial blurring based on the credit.

Put differently, PS 600 can compute an aggregate desired blur for each object (e.g., pixel 1390) within an artificial optical field 305b. PS 600 can assign a natural blur component to each object based on the object's depth in relation to the depth of the natural field-of-focus 310a. PS 600 can modify (e.g., subtract, divide) the pre-existing natural blur component from the aggregate desired blur to find an artificial blur component. PS 600 can then blur each object in artificial defocused foreground 320b based on the object's artificial blur component, not on its aggregate blur component.

With this technique, PS 600 can generate a gradual and continuous blur gradient in a defocused artificial optical field 305b where the aggregate blurring of each object reflects its depth from artificial field-of-focus 310b, and not its depth from natural field-of-focus 310a.

Figure 15:
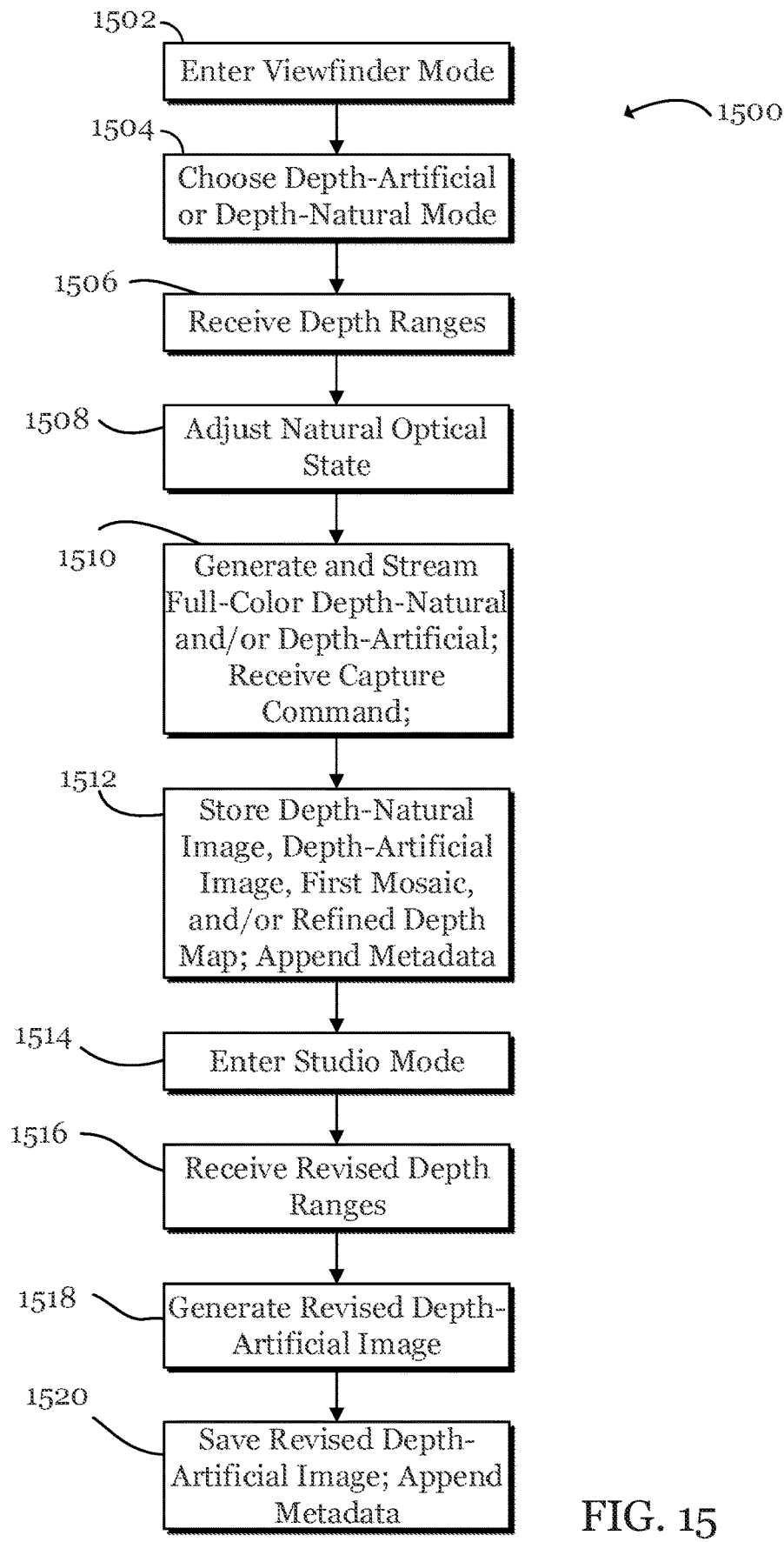
FIG. 15 shows a block diagram of a method, which can incorporate the method of FIG. 13.

FIG. 15 shows a method 1500 of manipulating method 1300 based on user-selected depth parameters. At block 1502, PS 600 can enter viewfinder mode. At block 1504, the user can press a single virtual button (e.g., an interface, such as a depth-natural/depth-artificial toggle, presented on display 120) to choose between depth-natural and depth-artificial mode. PS 600 can automatically disable user-selection of depth-artificial mode based on a known battery condition (e.g., remaining battery power of PS 600 being less than a predetermined value).

At block 1506, and if the user selected depth-artificial at block 1504, PS 600 can receive user-selected depth ranges 312b, 322b, 332b for artificial field-of-focus, artificial defocused foreground, and artificial defocused background. During block 1506, PS 600 can disable user-selection of at least some depth values based on a predetermined range of possible natural optical states 305a of camera 110. For example, PS 600 can prevent a user from transferring scene objects from a state of natural defocus to a state of artificial focus.

PS 600 can determine which depth values to disable based on the recognized natural optical state 300a of camera 110 and other camera(s) having at least a partially overlapping field of view with camera 110. For example, PS 600 can enable a user to transfer scene objects from a state of natural defocus to a state or artificial focus (with respect to camera 110) if another camera of PS 600 is able to capture those scene objects in a natural state of focus.

At block 1508, PS 600 can adjust the optical state 300a of camera 110 by, for example, moving a lens 210 forward or backward with a motor or actuator. PS 600 can adjust the natural optical state 300a of camera 110 to ensure that the maximum amount of scene objects within artificial field-of-focus 310b are captured within natural field-of-focus 310a.

If PS 600 includes multiple cameras with overlapping fields of view, PS 600 can perform the maximization by causing each of the multiple cameras to capture a different portion of the natural field-of-focus 310a. For example, if camera 110 is only able to capture 75% of the artificial field-of-focus 310b within natural field-of-focus 310a, then PS 600 can cause another camera with an overlapping field of view to capture at least the remaining 25%. PS 600 can later rectify and composite the rectified image pixels captured by the other camera with the image pixels 390 captured by camera 110. PS 600 can account for the possibility of spreading out natural field-of-focus 310a capture over multiple cameras during block 1506 (e.g., when computing which depth ranges are user-adjustable).

At block 1510, PS 600 can present a stream of full-color images (e.g., samples of full-color images) on display 102. The full-color images can be depth-natural 1342 or depth-artificial 1382 images. PS 600 can simultaneously present both depth-natural 1342 and depth-artificial 1382 images on display 120 as shown in FIG. 1. At block 1510, PS 600 can receive a capture command to, for example, capture an image. The image can be a typical photograph or a frame of a video. During block 1510, PS 600 can perform method 1300 to generate depth-artificial image 1382.

According to some embodiments, PS 600 delays the production of depth-artificial image 1382 based on the known remaining battery power, the known processing capabilities, and the current processing usage of PS 600. For example, PS 600 can delay performing one or more (e.g., all) of blocks 1350, 1360, 1370, and 1380 based on these factors. Alternatively or in addition, PS 600 can reduce a frame rate (e.g., the rate at which images are streamed during viewfinder mode) based on these factors. According to some embodiments, PS 600 presents depth-natural image 1342 and depth-artificial image 1382 simultaneously (e.g., substantially simultaneously or within a few moments of each other).

At block 1512, PS 600 can store one or more (e.g., all) of following items in non-volatile memory in response to the capture command at block 1510: depth-natural full-color image 1342, first depth-artificial full-color image 1382, first mosaic 1322, and refined phase-disparity map 1372. PS 600 can append metadata to depth-natural full-color image 1342 linking to first mosaic 1322 and/or refined phase-disparity 1372.

Embodiments of PS 600 apply the appended metadata if the user decides to revise previously selected artificial depth-ranges. For example, if an image was captured when the depth-natural toggle was on, PS 600 can rely on the metadata to apply an artificial depth effect (i.e., generate a depth artificial image 1382) to the depth-natural image any time post-capture. And if the depth-artificial toggle was on during capture, PS 600 can amend previously applied artificial depth ranges.

At block 1514, PS 600 can enter a studio mode in response to the user opening depth-natural full-color image 1342 and/or a first depth-artificial full-color image 1382 from memory. At block 1516, PS 600 can receive a revised user-selection of depth ranges 312b, 322b, 332b for artificial field-of-focus, artificial defocused foreground, and artificial defocused background.

At block 1518, PS 600 can generate a second (revised) depth-artificial image based on the depth-natural image 1342, refined depth-map 1372, and the revised depth ranges. Depth-natural image 1342 can be pre-stored or can be recreated from first mosaic 1322 (e.g., by performing blocks 1330 and 1340). Refined depth-map 1372 can be pre-stored or can be re-created from first mosaic 1322 and depth-natural image 1342 by performing blocks 1350, 1360, and 1370.

At block 1520, PS 600 can save the second depth-artificial image along with metadata linking to the above-discussed items used to create the second depth-artificial image. According to some examples, PS 600 does not rely on information in an first depth-artificial image 1382 to generate a second depth-artificial image 1382. Instead, PS 600 can rely on source data (e.g., first mosaic 1322, depth-natural full color image 1342, refined depth-map 1372) that has not been blurred to create the second depth-artificial image 1382 from scratch.

Figure 16:
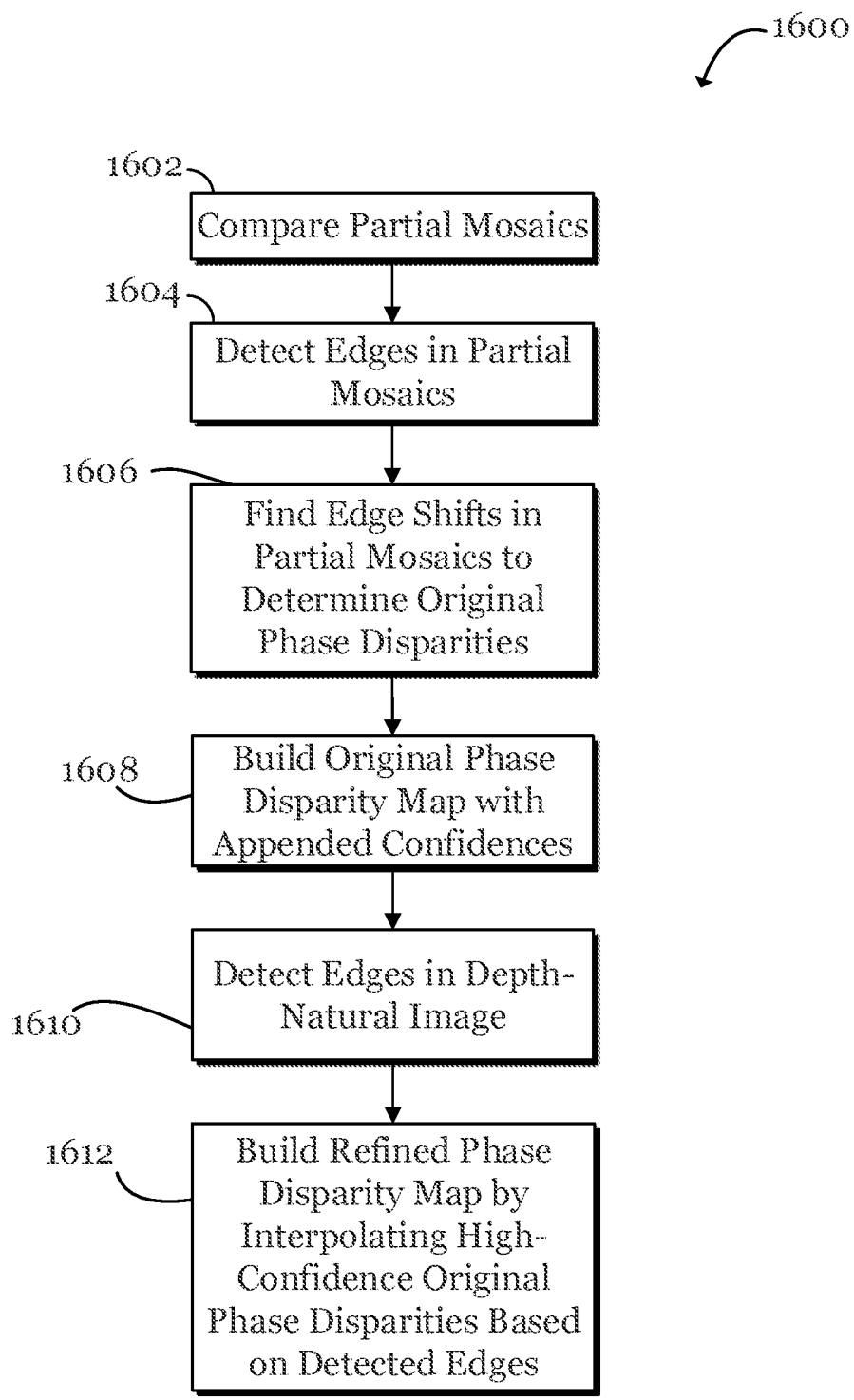
FIG. 16 shows a block diagram of a method, which can occur during the method of FIG. 15.

FIG. 16 shows a method 1600 for generating refined phase-disparity (i.e., depth) map 1372. Refined phase-disparity map 1372 is one example of a depth-map. Embodiments of PS 600 rely on depth-maps generated with other techniques (e.g., stereoscopic imaging, infrared range-finding). Depth-maps generated with other techniques can include any (e.g., all, some, none) of the features described herein with respect to phase-disparity maps 1362, 1372.

Figure 17:
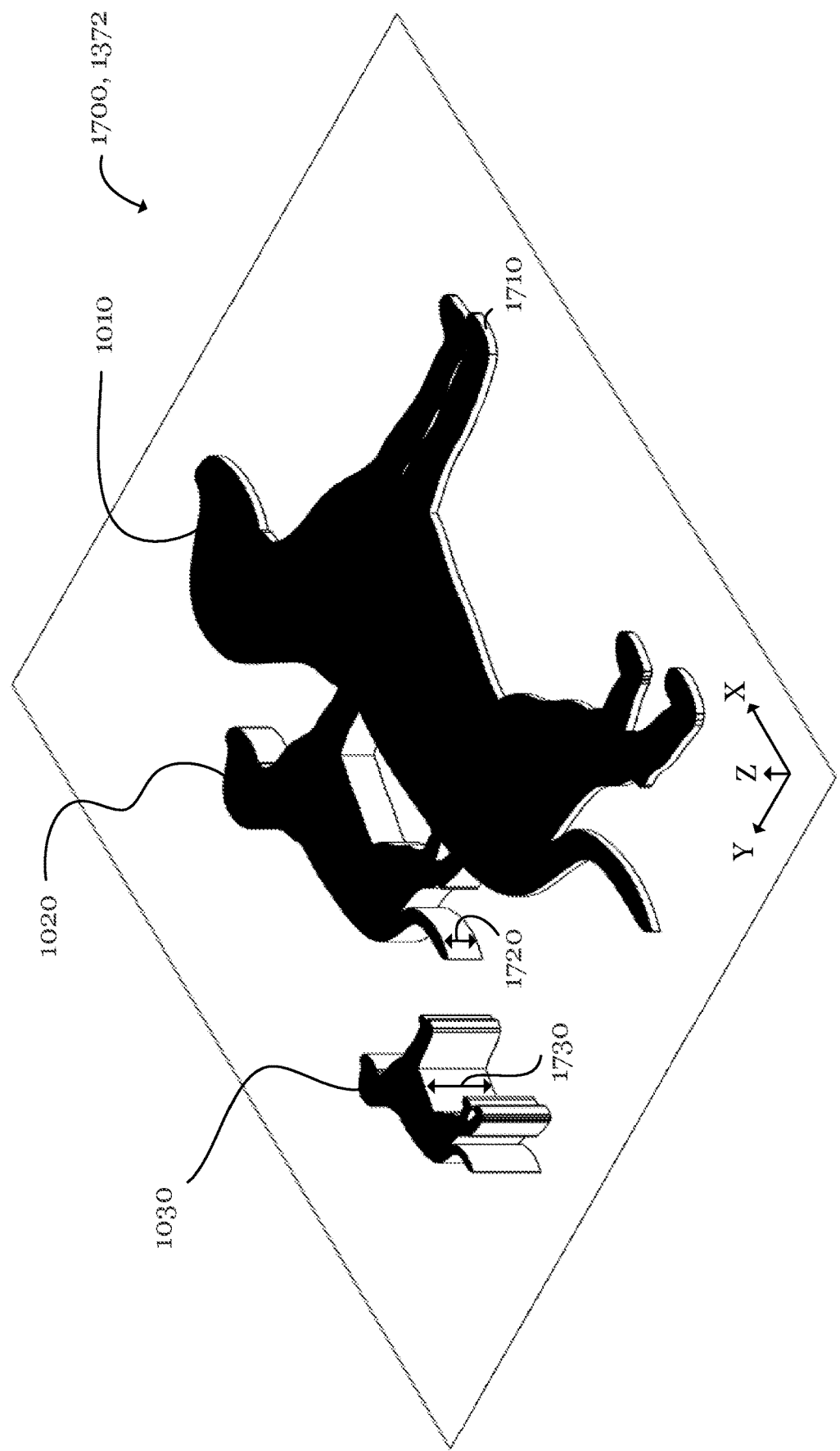
FIG. 17 schematically shows a depth-map of the image in FIG. 10.

An example refined phase-disparity map 1700, 1372 of image 1000 (FIG. 10) is shown in FIG. 17. Here, the thicknesses 1710, 1720, 1730 of dogs 1010, 1020, 1030 is a function of their phase-disparity (i.e., depth). As a result, far dog 1030 is thicker than middle dog 1020, which is thicker than near dog 1010. Each X-Y coordinate in refined map 1700 can be an image pixel 1390 or cluster thereof. Each Z coordinate in refined map 1700 can be an original 1364 or supplemented 1374 phase-disparity.

For convenience, refined map 1700 omits depth measurements of grass 1040 and sky 1050. Refined map 1700 shows the depths of dogs 1010, 1020, 1030 as being clearly and accurately defined. As a practical matter, regions of refined map 1700 can include errors. Errors can be most pronounced at depth boundaries such as the region of image 1000 (FIG. 10) where near dog 1010 intersects middle dog 1020.

PS 600 can rely on refined phase-disparity map 1372, 1700 to generate the second depth-artificial image 1382 from depth-natural image 1342. More specifically, PS 600 can use refined phase-disparity map 1372 to determine which objects in the depth-natural image 1342 to blur and how by how much. Method 1600 can occur during blocks 1350, 1360, and 1370 of method 1300 (FIG. 13).

At block 1602, PS 600 can compare partial mosaics 1352a, 1352b. Each partial mosaic 1352 can have a different perspective of the same scene. For example, partial mosaic 1352a can be a right-eye perspective of the scene while partial mosaic 1352b can be a left-eye perspective of the scene.

Figure 19:
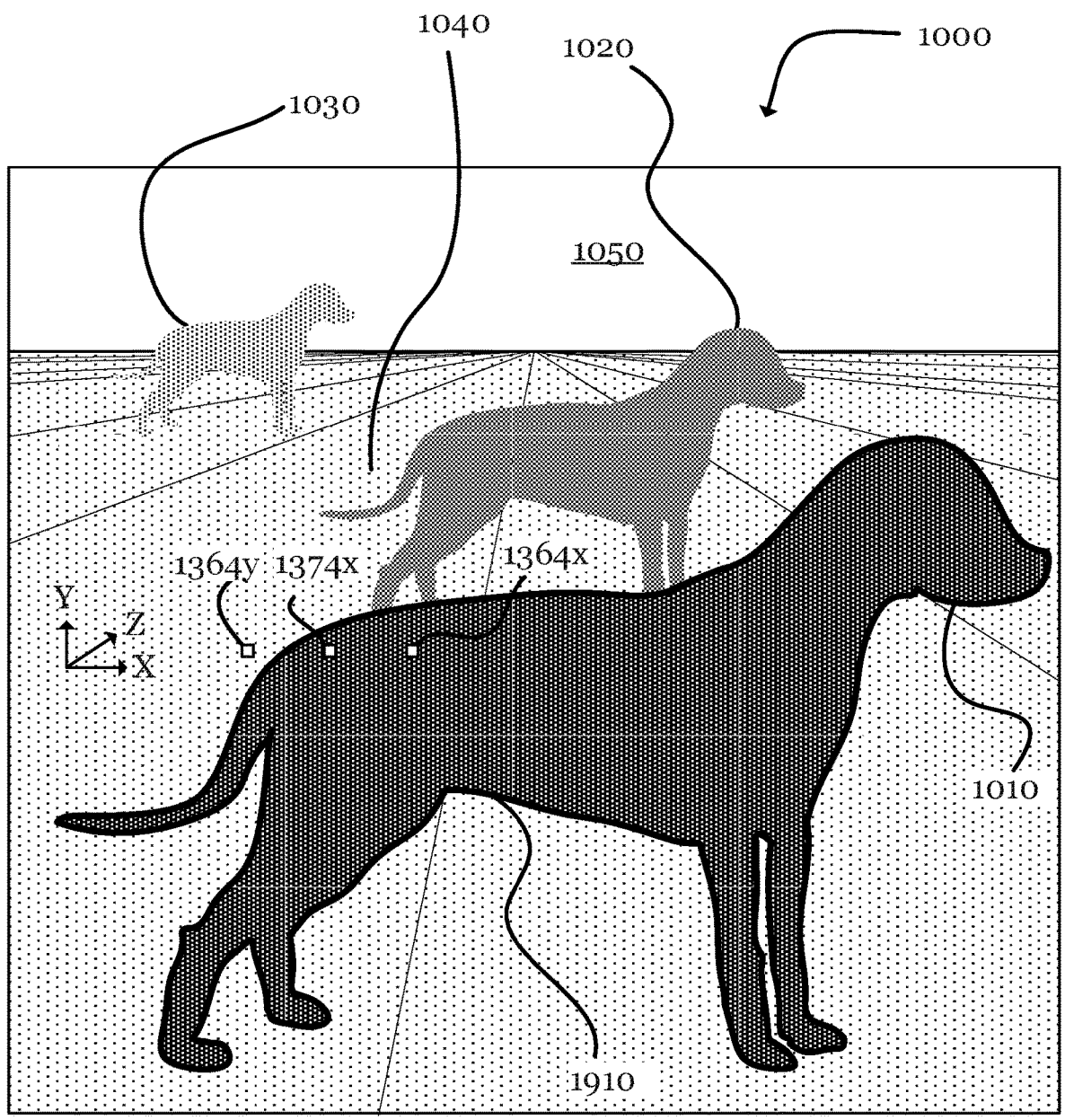
FIG. 19 schematically shows the depth-natural image in FIG. 10 with a bolded strong edge and schematically identified image pixels having original depths or supplementary depths.

At block 1604, PS 600 can detect (i.e., extract) edges in each of the partial mosaics 1352. PS 600 can apply one or more high pass filters to detect edges. According to some embodiments, PS 600 is configured to perform feature extraction through a neural network. The neural network can be trained to operate as a high pass filter that extracts edges corresponding to outer boundaries of scene objects (can be called strong edges). FIG. 19 (further discussed below) shows a possible outcome of the neural network, which extracted the strong edge 1910 defining the outer boundary of near dog 1010.

At block 1606, PS 600 can compare the partial mosaics to establish original phase-disparities 1364. More specifically, and for each edge, PS 600 can determine the position of the edge (or discrete portions thereof) in each partial mosaic 1352, and the difference (if any) between the positions. The difference can represent phase-disparity. For example, if edge A is at location X in partial mosaic 1352a and at location X+5 in partial mosaic 1352b, then its phase-disparity can be 5 [X+5−X=5] or −5 [X−(X+5)=−5]. Adjustments can be applied based on calibration parameters.

Figure 22:
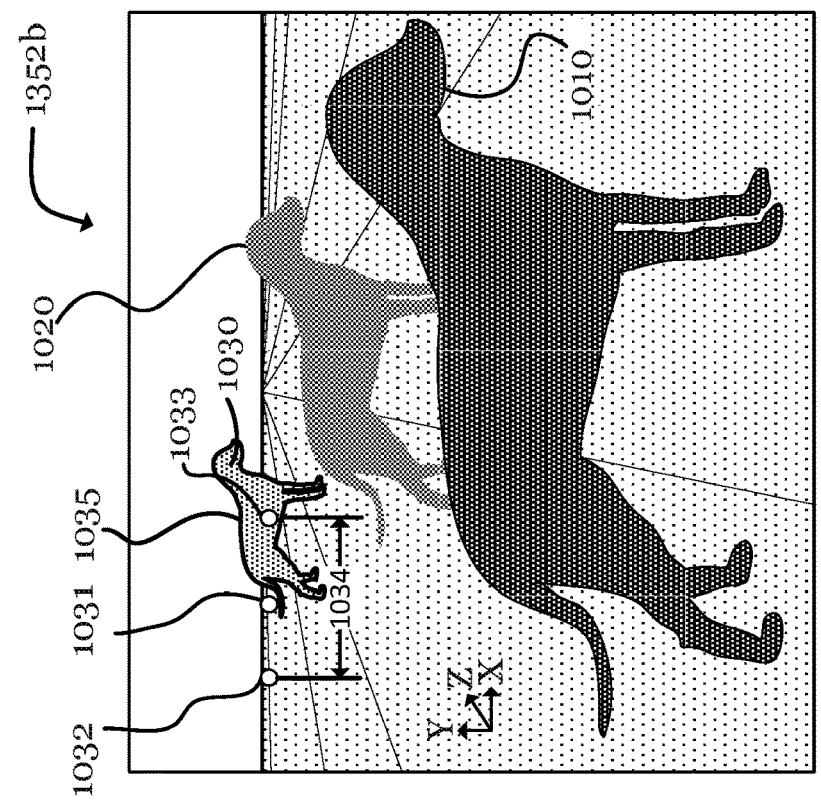
FIG. 22 schematically shows right-eye and left-eye views of two partial mosaics.
Figure 22:
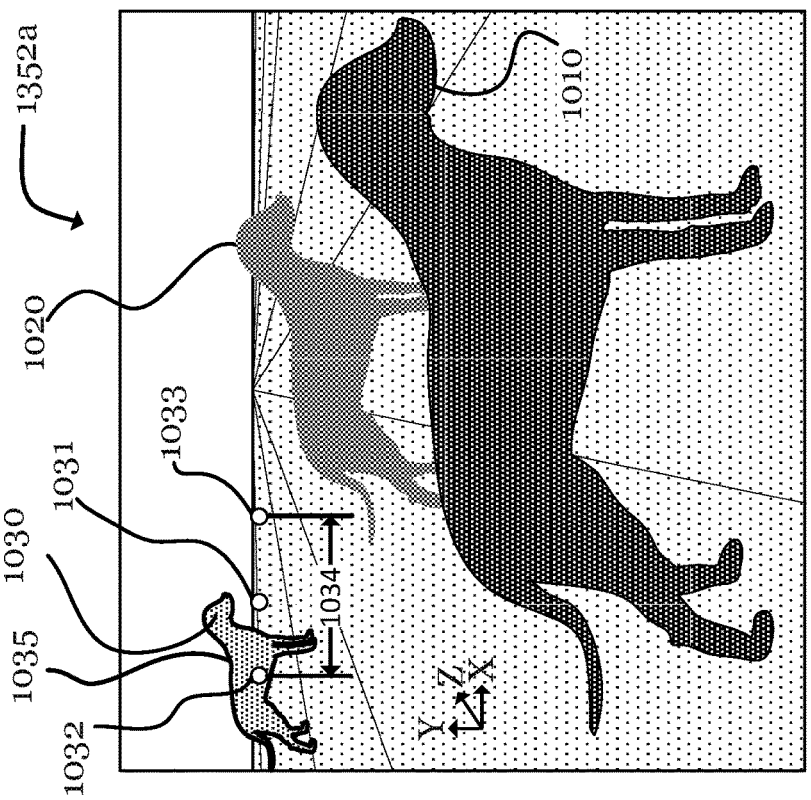

FIG. 22 shows partial mosaics 1352a,b of image 2200. Image 2200 is identical to image 1000 (FIG. 10), except in image 2200, the natural optical configuration 300a of camera 110 captured far dog 1030 with out-of-focus light. Near and middle dogs 1010, 1020 were captured with in-focus light. As such, near dog 1010 and middle dog 1020 are in the same positions in the partial mosaics (i.e., experienced a small, such as zero, phase shift), but far dog 1030 is shifted from its true location in both partial mosaics.

More specifically, in FIG. 22, far dog 1030 has a true center of 1031 (i.e., far dog 1030 would have a center of 1031 if captured with in-focus light), a center in the right-eye mosaic of 1032 and a center in the left-eye mosaic of 1033. Distance 1034 can represent the phase shift of far dog 1030, which can be detected by matching far dog strong edge 1035 in right-eye mosaic 1352a with far dog strong edge 1035 in left-eye mosaic 1352b.

Referring again to FIG. 16, at block 1608, PS 600 can build original phase-disparity map 1362 based on the above-discussed phase-disparities. Edges in depth-natural image 1342 exhibiting large shifts between the partial mosaics 1352 can have high-magnitude phase-disparities while edges with small or no shifts can have low-magnitude phase-disparities. The sign of a phase-disparity can identify whether the edge is in defocused foreground or background. In some embodiments, PS 600 records magnitude of phase shift, but not sign, in the phase-disparity maps 1362, 1372. These embodiments may not distinguish between defocused foreground and defocused background and blur both simultaneously.

At block 1610, PS 600 can detect edges in depth-natural full-color image 1342 (e.g., via one or more high-pass filters such as a deep neural network configured for edge extraction). At block 1612, PS 600 can build refined phase-disparity map 1372 by interpolating the original phase-disparities 1364 based on the detected full-color edges to generate supplementary (also called refined) phase-disparities 1374. For example, PS 600 can decline to interpolate between original phase-disparities separated by a strong edge in the depth natural full-color image 1342. At the same time, PS 600 can interpolate between original phase-disparities 1364 unseparated by a strong edge in the depth-natural image 1342. PS 600 can perform this process until each image pixel 1390 has been assigned a phase-disparity (whether original 1364 or supplementary 1374).

According to some embodiments, PS 600 appends a confidence to each computed original phase-disparity during block 1606. The confidence can describe the likelihood that PS 600 correctly matched the same edge in the partial mosaics 1352 (i.e., the likelihood that PS 600 correctly found phase-disparity). At block 1608, PS 600 can build the original phase-disparity map 1362 by assigning an original phase-disparity plus appended confidence to each image pixel 1390 (i.e., each X-Y coordinate in the original phase-disparity map 1362).

At block 1612, PS 600 can build refined phase-disparity map 1372 by replacing low-confidence or missing original phase-disparities 1364 with supplementary phase-disparities 1374 interpolated based on edges in depth-natural full-color image 1342. The interpolations can exclusively rely on high-confidence (i.e., higher confidence) original phase-disparities 1364. PS 600 can replace each low-confidence (i.e., lower-confidence) original phase-disparity 1364 with a supplementary phase-disparity 1374 by interpolation between high-confidence original phase-disparities 1364 based on edges (e.g., strong edges) detected in depth-natural full-color image 1342.

During interpolation to compute a supplementary phase-disparity 1374 (which can involve a weighted average between neighboring high-confidence original phase-disparities 1364), the weight assigned to any particular high-confidence original phase-disparity 1364 in the neighborhood can be based on the strength of an edge (if any) separating the particular original phase-disparity 1364 from the supplementary phase-disparity 1374. Ultimately, as shown in FIG. 13, refined phase-disparity map 1372 can include high-confidence original phase-disparities 1364 and interpolated supplementary phase-disparities 1374.

Figure 18:
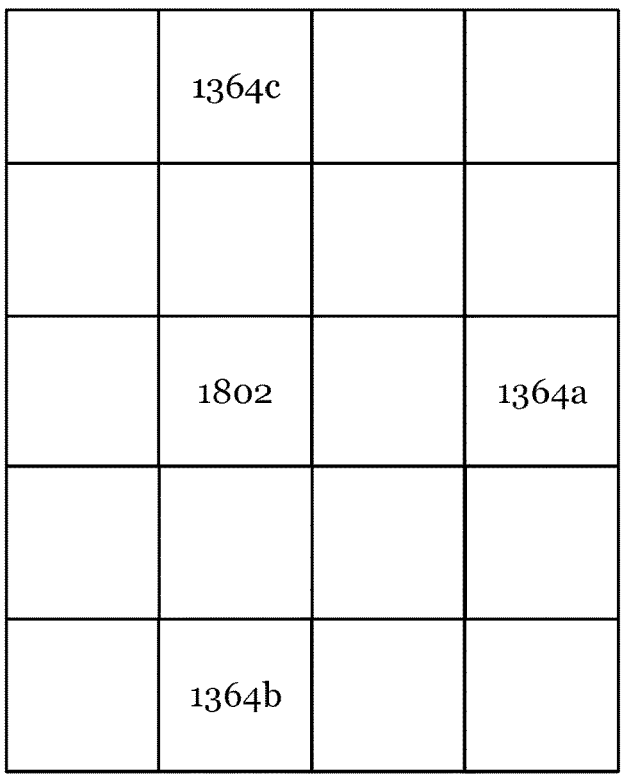
FIG. 18 schematically shows an original depth-map and an intermediate stage of a refined depth-map.
Figure 18:
Figure 18:
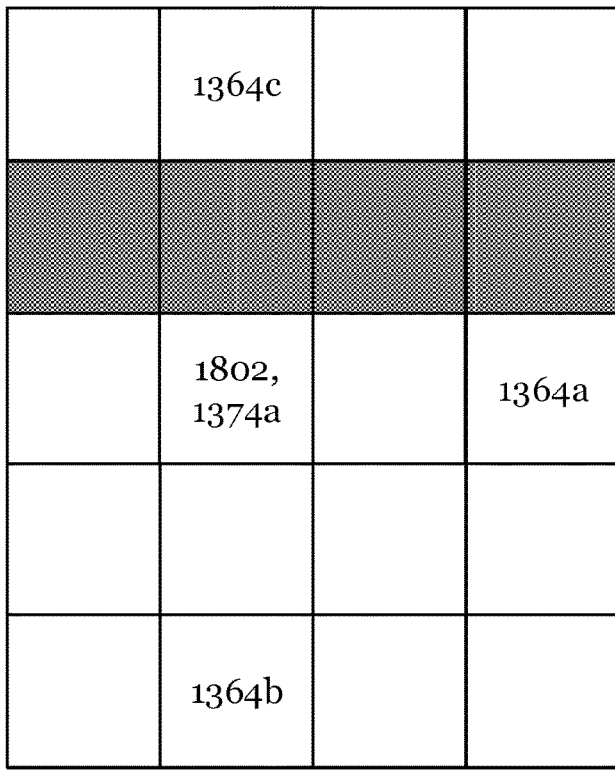

FIG. 18 shows an original phase-disparity map 1362 and a refined phase-disparity map 1372 during an intermediate stage. PS 600 identified original phase-disparities 1364a-c with a high confidence. PS 600 did not assign a high-confidence original phase-disparity 1364 to coordinate 1802

To interpolate supplementary phase-disparities, PS 600 can rely on a strong edge 1802 detected in the depth-natural image 1342. In the absence of strong edge 1802, PS 600 might interpolate new or secondary phase-disparity 1374a by assigning equal weights to phase-disparities 1364a-c. But given the presence of strong edge 1802, PS 600 can assign a greater weight to original phase-disparities 1364 on the same side of strong edge 1802 as coordinate 1802 (i.e., original phase-disparities 1364a,b) and a lower (e.g., zero) weight to original phase-disparities 1364 on an opposite side of edge 1802 (i.e., original phase-disparity 1364c). In the example of FIG. 18, strong edge 1802 is not actually incorporated into the refined depth-map 1372, it is only shown to illustrate the concepts discussed above. PS 600 can compute the remaining blank coordinates (i.e., coordinates without original high-confidence phase-disparities 1364).

Another example follows. Referring to FIGS. 10 and 19, PS 600 can find the strong edge 1910 of near dog 1010 (see FIG. 19) with a high-pass filter (e.g., a deep neural network configured to extract edges). To find supplementary phase-disparities 1374, PS 600 can rely on original phase-disparities 1364 disposed within near dog strong edge 1910. The interpolation algorithm can discount (e.g., give zero weight to) original phase-disparities 1364 disposed across strong edge 1910.

In FIG. 19, original phase-disparities 1364x and 1364y are equidistant from supplementary phase-disparity 1374x. To compute supplementary phase-disparity 1374x, PS 600 can apply an interpolation algorithm that relies on neighboring original high-confidence phase-disparities 1364. The algorithm can weight each neighboring original phase-disparity 1364 based on (a) the distance of the neighboring original phase-disparity 1364 from the supplementary phase-disparity 1374, (b) how many edges are disposed between the neighboring original phase-disparity 1364 and the supplementary phase-disparity 1374, and (c) a strength of each such edge.

Referring to FIG. 19, strong edge 1910 is disposed between original phase-disparity 1364y and supplementary phase-disparity 1374x. Therefore, PS 600 can assign original phase-disparity 1364y a low (e.g., zero) weight when interpolating supplementary phase-disparity 1374x. Because no strong edges are disposed between original phase-disparity 1364x and supplementary phase-disparity 1374x, PS 600 can give original phase-disparity 1364x a high weight when interpolating supplementary phase-disparity 1374x. PS 600 can repeat the above-described process for middle dog 1020, far dog 1030, grass 1040, and sky 1050.

Figure 20:
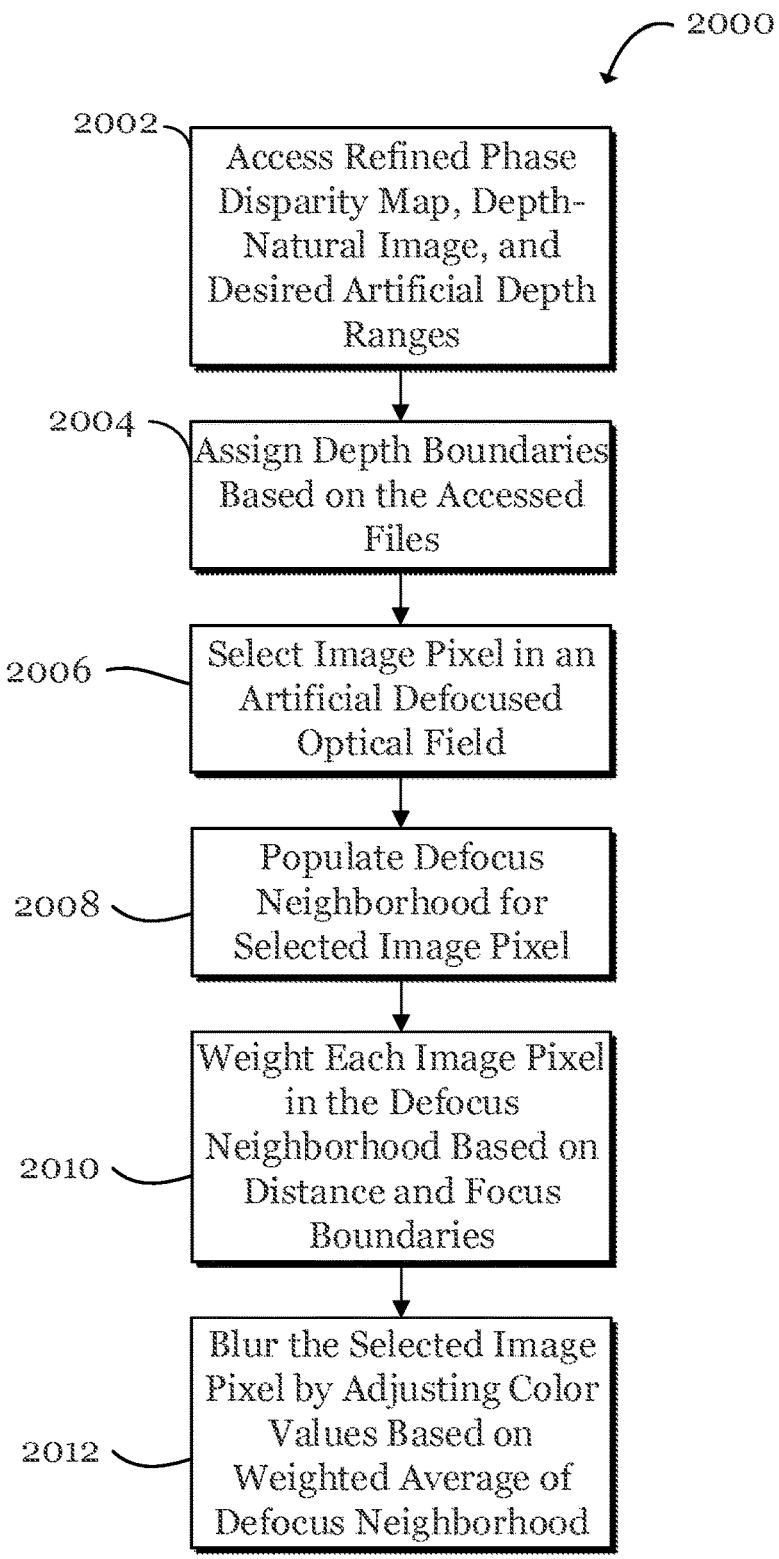
FIG. 20 is a block diagram of a method, which can occur during the method of FIG. 13.

FIG. 20 shows a method 2000 of defocusing (i.e., blurring) a depth-natural image 1342 to generate a depth-artificial image 1382. The method of FIG. 20 can occur during block 1380 of FIG. 13.

At block 2002, PS 600 can access refined phase-disparity map 1372, depth-natural image 1342, and the desired artificial depth ranges 312b, 322b, 332b. PS 600 can access these items by loading the items from memory (volatile or non-volatile) and/or building the items from scratch (e.g., from a first mosaic 1322).

At block 2004, PS 600 can assign depth boundaries to the depth-natural image 1342 (e.g., build a focus boundary map corresponding to the depth-natural image 1342). Each depth boundary 2005 can separate: (a) artificial field-of-focus 310b from artificial foreground 320b, (b) artificial field-of-focus 310b from artificial background 330b, or (c) artificial foreground 320b from artificial background 330b.

PS 600 can assign depth boundaries 2005 by identifying phase-disparities in depth-natural image 1342 mapping to the ends of the desired artificial depth ranges. For example, field-of-focus artificial depth range 312b can extend from 15-25 meters and therefore encompass objects located at 20 meters. PS 600 can identify image pixels 1390 in depth-natural image 1342 with phase-disparities falling within 15-25 meters (numerical conversion between phase-disparity and depth is known in the art). PS 600 can set these image pixels 1390 as being within the artificial field-of-focus. PS 600 can apply the same process to locate artificial foreground 320b and artificial background 330b.

Figure 21:
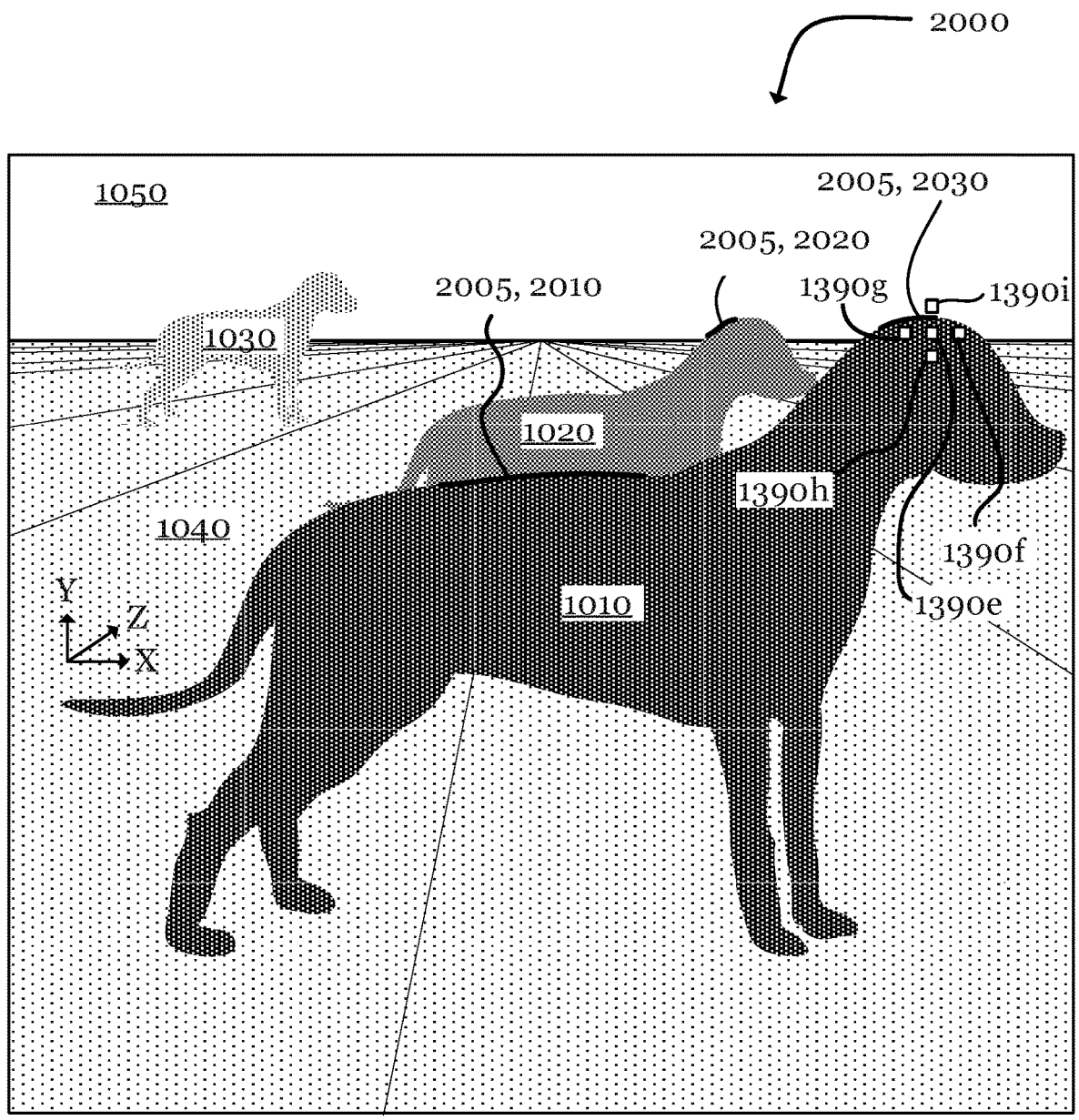
FIG. 21 schematically shows an image similar to the image in FIG. 10, except with a new position for the nearest dog.

PS 600 can place depth boundaries 2005 along transitions between artificial optical fields 305b. FIG. 21 shows examples of depth-boundaries 2005 with depth-natural image 2000. Depth-natural image 2000, 1342 is the same as depth-natural image 1000 (FIG. 10), except near dog 1010 has walked toward the camera, causing her head (not labeled) to contrast with sky 1050.

The example of FIG. 21 relies on the following assumptions: First, dogs 1010, 1020, 1030 and sky 1050 are within the natural field-of-focus 310a (e.g., at the time of capture camera 110 had natural general optical configuration 302a). Second, middle dog 1020 is within the artificial field-of-focus 310b, near dog 1010 is within the artificial defocused foreground 320b, far dog 1030 is within the artificial defocused background 330b, and sky 1050 is within the artificial defocused background 330b.

In FIG. 21, depth boundary 2010 (partially shown) divides artificial field-of-focus 310b from artificial defocused foreground 320b. Depth boundary 2020 (partially shown) divides artificial field-of-focus 310b from artificial defocused background 330b. Depth boundary 2030 (partially shown) divides artificial defocused background 330b from artificial defocused foreground 320b. Depth-boundaries 2005 can follow strong edges in at least some locations. But, for example, a depth-boundary 2005 may not exist at the feet of dogs 1010, 1030 (which include strong edges contrasting with grass 1040) since the feet of those dogs are at the same depth as the grass 1040 below.

PS 600 can artificially blur depth-natural image 1342 by sweeping one or more low pass filters (e.g., Gaussian blur filters) across each image pixel 1390 in artificial defocused foreground/background 320b, 330b. More specifically, and at block 2006, PS 600 can select an image pixel 1390 in depth-natural image 1342 for artificial defocusing (i.e., artificial blurring) disposed within artificial foreground or background 320b, 330b. At block 2008, PS 600 can populate an artificial defocus neighborhood for the selected image pixel. The neighborhood can include image pixels 1390 surrounding the selected image pixel 1390. For example, the neighborhood can include image pixels 1390 in a 3×3 square centered on the selected image pixel.

At block 2010, PS 600 can assign a weight to each image pixel 1390 within the populated neighborhood. The weight assignments can be based on focus boundaries 2005. More specifically, PS 600 can assign a low (e.g., zero) weight to image pixels 1390 in the neighborhood disposed on the other side of a focus boundary with respect to the selected image pixel 1390. PS 600 can assign a high weight to image pixels 1390 in the neighborhood disposed on the same side of a focus boundary with respect to the selected image pixel 1390. In addition to focus boundary, PS 600 can weight each image pixel in the neighborhood based on its distance from the selected image pixel.

Referring to FIG. 21, image pixel 1390e has been selected. Image pixels 1390f-i are equidistance from image pixel 1390e and fall within neighborhood 2050. Although image pixel 1390i is within neighborhood 2050, PS 600 can assign image pixel 1390*i* a low (i.e., lower) weight (e.g., zero) for being disposed across focus boundary 2005, 2030. Image pixels 1390*f-h* can each receive the same weight.

At block 2012, PS 600 can adjust the color values of the selected image pixel (e.g., 1390*e*) based on the color values of the neighborhood image pixels (e.g., 1390*e-i*) and the weights. Put differently, PS 600 can blend the depth-natural color values of selected image pixel with color values from neighboring image pixels. PS 600 can set the defocused (i.e., depth artificial) color values of the selected image pixel as the outcome.

For example, PS 600 can take a first weighted average of the neighborhood image pixels (e.g., 1390*e-i*), where, as previously discussed, each weight is a function of (a) distance from the selected image pixel and/or (b) focus boundary separation from the selected image pixel. PS 600 can calculate a second weighted average where a first weight, X, is assigned to the first weighted average and a second weight, Y, is assigned to the depth-natural color values of the selected image pixel: $(R,G,B)_{second\ weighted\ average} = X*(R,G,B)_{first\ weighted\ average} + Y*(R,G,B)_{selected\ image\ color\ values}$, where X+Y=1 and both X and Y are greater than or equal to zero. PS 600 can use the calculated second weighted average as the new defocused color value of the selected image pixel (e.g., 1390*e*): $(R,G,B)_{second\ weighted\ average} = (R,G,B)_{defocused\ color\ value}$.

Each input in the above equations can be a depth-natural color value of a pixel such that each defocused color value is only a function of depth-natural color values. PS 600 can select first and second weights, X and Y, based on the amount of artificial blurring desired for the selected image pixel. For example, if the level of desired artificial blurring is low, then X can be low (e.g., zero) and Y can be high (e.g., one).

Techniques for determining the desired level of artificial blurring were previously discussed and can depend on: (a) depth of the selected image pixel in relation to the artificial field-of-focus 310*b* and/or (b) the amount of natural blurring that the selected image pixel experienced due to the natural optical state 300*a* of camera 110.

As previously discussed, the algorithm for blurring artificial defocused foreground 320*b* can be different from the algorithm for blurring artificial defocused background 330*b*. For example: (a) the neighborhood sizes can be different, (b) artificial foreground 320*b* blurring can assign a low (e.g., zero) weight to image pixels in a neighborhood across a focus boundary 305, whereas artificial background 330*b* blurring can assign a high weight to image pixels in a neighborhood across a focus boundary 305 (or vice versa), and/or (c) artificial foreground 320*b* blurring can only accept depth-natural color values as inputs, whereas artificial background 330*b* blurring can accept depth-artificial color values (i.e., previously blurred image pixels) as inputs. Therefore, all else being equal, an image pixel 1390 in artificial foreground 320*b* can experience a different kind of blurring than an image pixel 1390 in artificial background 330*b*.

PS 600 can repeat blocks 2006-2012 until each image pixel in artificial defocused foreground and/or background has reached the appropriate level of artificial and/or aggregate blurring. PS 600 can, if desired, perform additional adjustments (e.g., color balancing), then deliver the result as a depth-artificial image 1382.

Figure 6:
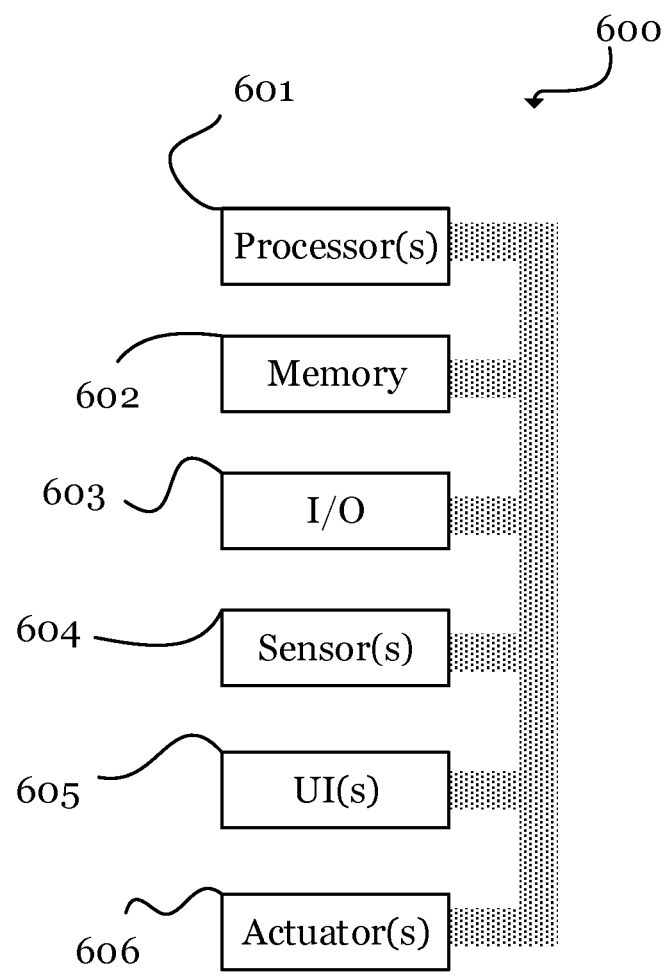
FIG. 6 shows a block-diagram of an exemplary processing system, which can be configured to perform any of the methods and operations disclosed herein. In some embodiments, the processing system is an aspect of the mobile device.

Referring to FIG. 6, PS 600 can include one or more processors 601, memory 602, one or more input/output devices 603, one or more sensors 604, one or more user interfaces 605, and one or more actuators 606.

Processors 601 can include one or more distinct processors, each having one or more cores. Each of the distinct processors can have the same or different structure. Processors 601 can include one or more central processing units (CPUs), one or more graphics processing units (GPUs), circuitry (e.g., application specific integrated circuits (ASICs)), digital signal processors (DSPs), and the like. Processors 601 can be mounted on a common substrate or to different substrates.

Processors 601 are configured to perform a certain function, method, or operation at least when one of the one or more of the distinct processors is capable of executing code, stored on memory 602 embodying the function, method, or operation. Processors 601 can be configured to perform any and all functions, methods, and operations disclosed herein.

For example, when the present disclosure states that PS 600 performs/can perform task "X", such a statement should be understood to disclose that PS 600 can be configured to perform task "X". Mobile device 100 and PS 600 are configured to perform a function, method, or operation at least when processors 601 are configured to do the same.

Memory 602 can include volatile memory, non-volatile memory, and any other medium capable of storing data. Each of the volatile memory, non-volatile memory, and any other type of memory can include multiple different memory devices, located at multiple distinct locations and each having a different structure.

Examples of memory 602 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code saved in memory 602.

Input-output devices 603 can include any component for trafficking data such as ports, antennas (i.e., transceivers), printed conductive paths, and the like. Input-output devices 603 can enable wired communication via USB®, DisplayPort®, HDMI®, Ethernet, and the like. Input-output devices 603 can enable electronic, optical, magnetic, and holographic, communication with suitable memory 603. Input-output devices can enable wireless communication via WiFi®, Bluetooth®, cellular (e.g., LTE®, CDMA®, GSM®, WiMax®, NFC®), GPS, and the like. Input-output devices 603 can include wired and/or wireless communication pathways.

Sensors 604 can capture physical measurements of environment and report the same to processors 601. Examples of sensors 604 include photodiodes and thermocouples. User interface 605 can include display 120 (e.g., LED touch-screens (e.g., OLED touchscreens), physical buttons, speakers, microphones, keyboards, and the like. Actuators 606 can enable processors 601 to control mechanical forces. If camera 110 includes auto-focus, motors/actuators 606 can move a lens along its optical axis to provide auto-focus and/or perform optical image stabilization.

PS 600 can be distributed (e.g., primary non-volatile memory 423 can be disposed in a remote server and the other modules can be disposed in mobile device 100). Camera 110 can be an aspect of PS 600. PS 600 can have a modular design where certain modules (e.g., camera 110) have a plurality of the aspects shown in FIG. 6. For example, image sensor 220 can include one or more processors 601, memory 602, I/O 603, and sensors 604.

We claim:

1. A method for image processing comprising, with a processing system comprising one or more processors:
generating an original depth-map of a depth-natural image, the depth-natural image comprising image pixels, the original depth-map comprising original depths, the original depths mapping to one or more of the image pixels;
detecting an edge in the depth-natural image;
determining an interpolated supplementary depth through interpolation based on the original depths and the detected edge; and
blurring the depth-natural image based on the interpolated supplementary depth to generate a first depth-artificial image.

2. The method of claim 1, wherein the depth-natural image exhibits a natural optical state and the blurring transforms the depth-natural image into the first depth-artificial image, so the first depth-artificial image exhibits an artificial optical state.

3. The method of claim 2, wherein the natural optical state of the depth-natural image lacks a defocused background whereas the artificial optical state of the first depth-artificial image comprises a defocused background.

4. The method of claim 2 comprising:
receiving the artificial optical state, which comprises two optical fields; and
generating the depth-natural image such that regions of the first depth-artificial image mapping to one of the optical fields are out-of-focus while regions of the first depth-artificial image mapping to the other optical field are in-focus.

5. The method of claim 4, wherein the received artificial optical state comprises an artificial depth-range for at least one of the artificial optical fields.

6. The method of claim 2 comprising:
receiving a command to generate a revised artificial optical state;
in response to the command, accessing the depth-original image and accessing the interpolated supplementary depth; and
blurring the depth-natural image based on the interpolated supplementary depth and the revised artificial optical state to generate a generate a second depth-artificial image different from the first depth-artificial image.

7. The method of claim 1, wherein generating the original depth-map comprises associating a different confidence value with each of the original depths;
the method comprising determining the interpolated supplementary depth based on the different confidence values of the original depths.

8. The method of claim 1 comprising:
accessing a depth-natural mosaic;
demosaicing the depth-natural mosaic into the depth-natural image; and
generating the original depth-map of the depth-natural image using the depth-natural mosaic.

9. The method of claim 1 wherein the processing system comprises a camera with a lens, and the first depth-artificial image exhibits an artificial optical state, the method comprising:
receiving the artificial optical state;
moving the lens based on the received artificial optical state;
capturing the depth-natural image with the camera and through the lens; and
blurring the depth-natural image to generate the first depth-artificial image exhibiting the artificial optical state.

10. The method of claim 1 comprising:
assigning depth-boundaries to the depth-natural image, each depth-boundary dividing (a) a defocused foreground from a field-of-focus, (b) a defocused background from the field-of-focus, or (c) the defocused foreground from the defocused background; and
blurring the depth-natural image based on the depth-boundaries.

11. A processing system comprising one or more processors configured to:
generate an original depth-map of a depth-natural image, the depth-natural image comprising image pixels, the original depth-map comprising original depths, the original depths mapping to one or more of the image pixels;
detect an edge in the depth-natural image;
determine an interpolated supplementary depth through interpolation based on the original depths and the detected edge; and
blur the depth-natural image based on the interpolated supplementary depth to generate a first depth-artificial image.

12. The system of claim 11, wherein the depth-natural image exhibits a natural optical state and the blurring transforms the depth-natural image into the first depth-artificial image, so the first depth-artificial image exhibits an artificial optical state.

13. The system of claim 12, wherein the natural optical state of the depth-natural image lacks a defocused background whereas the artificial optical state of the first depth-artificial image comprises a defocused background.

14. The system of claim 12 wherein the one or more processors are configured to:
receive the artificial optical state, which comprises two optical fields; and
generate the depth-natural image such that regions of the first depth-artificial image mapping to one of the optical fields are out-of-focus while regions of the first depth-artificial image mapping to the other optical field are in-focus.

15. The system of claim 14, wherein the received artificial optical state comprises an artificial depth-range for at least one of the artificial optical fields.

16. The system of claim 12, wherein the one or more processors are configured to:
receive a command to generate a revised artificial optical state;
in response to the command, access the depth-original image and accessing the interpolated supplementary depth; and
blur the depth-natural image based on the interpolated supplementary depth and the revised artificial optical state to generate a generate a second depth-artificial image different from the first depth-artificial image.

17. The system of claim 11, wherein the one or more processors are configured to:
generate the original depth-map by associating a different confidence value with each of the original depths;
determine the interpolated supplementary depth based on the different confidence values of the original depths.

18. The system of claim 11, wherein the one or more processors are configured to:

access a depth-natural mosaic;
demosaic the depth-natural mosaic into the depth-natural image; and
generate the original depth-map of the depth-natural image using the depth-natural mosaic.

19. The system of claim 11, wherein the processing system comprises a camera with a lens, and the first depth-artificial image exhibits an artificial optical state, the one or more processors being configured to:
receive the artificial optical state;
move the lens based on the received artificial optical state;
capture the depth-natural image with the camera and through the lens; and
blur the depth-natural image to generate the first depth-artificial image exhibiting the artificial optical state.

20. The system of claim 11, wherein the one or more processors are configured to:
assign depth-boundaries to the depth-natural image, each depth-boundary dividing (a) a defocused foreground from a field-of-focus, (b) a defocused background from the field-of-focus, or (c) the defocused foreground from the defocused background; and
blur the depth-natural image based on the depth-boundaries.

21. A non-transitory computer-readable medium comprising program code, which, when executed by one or more processors, causes the one or more processors to perform operations, the program code comprising code for:
generating an original depth-map of a depth-natural image, the depth-natural image comprising image pixels, the original depth-map comprising original depths, the original depths mapping to one or more of the image pixels;
detecting an edge in the depth-natural image;
determining an interpolated supplementary depth through interpolation based on the original depths and the detected edge; and
blurring the depth-natural image based on the interpolated supplementary depth to generate a first depth-artificial image.

* * * * *